US011331620B2

(12) United States Patent
Nagavarapu et al.

(10) Patent No.: US 11,331,620 B2
(45) Date of Patent: *May 17, 2022

(54) APPARATUS AND SYSTEM FOR SWING ADSORPTION PROCESSES

(71) Applicant: ExxonMobil Upstream Research Company, Spring, TX (US)

(72) Inventors: Ananda Krishna Nagavarapu, Houston, TX (US); Bennett D. Marshall, Conroe, TX (US); Brett L. Ryberg, Dallas, TX (US); Stephen Wright, Georgetown, TX (US)

(73) Assignee: ExxonMobil Upstream Research Company, Spring, TX (US)

(*) Notice: Subject to any disclaimer, the term of this patent is extended or adjusted under 35 U.S.C. 154(b) by 233 days.

This patent is subject to a terminal disclaimer.

(21) Appl. No.: 16/252,975

(22) Filed: Jan. 21, 2019

(65) Prior Publication Data
US 2019/0224613 A1    Jul. 25, 2019

Related U.S. Application Data

(60) Provisional application No. 62/621,246, filed on Jan. 24, 2018.

(51) Int. Cl.
*B01D 53/047* (2006.01)
*B01D 53/04* (2006.01)
(Continued)

(52) U.S. Cl.
CPC ......... *B01D 53/0473* (2013.01); *B01D 53/02* (2013.01); *B01D 53/0438* (2013.01);
(Continued)

(58) Field of Classification Search
CPC .............. B01D 53/0473; B01D 53/02; B01D 53/0438; B01D 53/0446; B01D 53/0462;
(Continued)

(56) References Cited

U.S. PATENT DOCUMENTS

| 1,868,138 A | 7/1932 | Fisk |
| 3,103,425 A | 9/1963 | Meyer |

(Continued)

FOREIGN PATENT DOCUMENTS

| EP | 0257493 | 2/1988 |
| EP | 0426937 | 5/1991 |

(Continued)

OTHER PUBLICATIONS

Dubbeldam, D., et al., (2013) "On the inner workings of Monte Carlo codes" *Molecular Simulation*, vol. 39, Nos. 14-15, pp. 1253-1292.
(Continued)

*Primary Examiner* — Akash K Varma
(74) *Attorney, Agent, or Firm* — ExxonMobil Upstream Research Company—Law Department

(57) ABSTRACT

Provided are apparatus and systems for performing a swing adsorption process. This swing adsorption process may involve performing dampening for fluctuations in the streams conducted away from the adsorbent bed unit. The process may be utilized for swing adsorption processes, such as rapid cycle TSA and/or rapid cycle PSA, which are utilized to remove one or more contaminants from a gaseous feed stream.

14 Claims, 4 Drawing Sheets

(51) Int. Cl.
*C10L 3/10* (2006.01)
*B01D 53/02* (2006.01)

(52) U.S. Cl.
CPC ..... *B01D 53/0446* (2013.01); *B01D 53/0462* (2013.01); *C10L 3/104* (2013.01); *B01D 2253/108* (2013.01); *B01D 2253/204* (2013.01); *B01D 2256/24* (2013.01); *B01D 2256/245* (2013.01); *B01D 2257/304* (2013.01); *B01D 2257/504* (2013.01); *B01D 2257/80* (2013.01); *B01D 2259/4062* (2013.01); *B01D 2259/40079* (2013.01); *B01D 2259/40081* (2013.01); *C10L 2200/0286* (2013.01); *C10L 2290/542* (2013.01)

(58) Field of Classification Search
CPC .............. B01D 53/047; B01D 53/04; B01D 2253/108; B01D 2253/204; B01D 2256/24; B01D 2256/245; B01D 2257/304; B01D 2257/504; B01D 2257/80; B01D 2259/40079; B01D 2259/40081; B01D 2259/4062; C10L 3/104; C10L 3/10; C10L 2200/0286; C10L 2290/542; Y02C 20/40; Y02C 10/08
USPC ........................................................ 95/97
See application file for complete search history.

(56) References Cited

U.S. PATENT DOCUMENTS

| | | | |
|---|---|---|---|
| 3,124,152 A | 3/1964 | Payne | |
| 3,142,547 A | 7/1964 | Marsh et al. | |
| 3,508,758 A | 4/1970 | Strub | |
| 3,594,983 A | 7/1971 | Yearout | |
| 3,602,247 A | 8/1971 | Bunn et al. | |
| 3,788,036 A | 1/1974 | Lee et al. | |
| 3,967,464 A | 7/1976 | Cormier et al. | |
| 4,187,092 A | 2/1980 | Woolley | |
| 4,261,815 A | 4/1981 | Kelland | |
| 4,324,565 A | 4/1982 | Benkmann | |
| 4,325,565 A | 4/1982 | Winchell | |
| 4,329,162 A | 5/1982 | Pitcher | |
| 4,340,398 A | 7/1982 | Doshi et al. | |
| 4,386,947 A | 6/1983 | Mizuno et al. | |
| 4,421,531 A | 12/1983 | Dalton, Jr. et al. | |
| 4,445,441 A | 5/1984 | Tanca | |
| 4,461,630 A | 7/1984 | Cassidy et al. | |
| 4,496,376 A | 1/1985 | Hradek | |
| 4,631,073 A | 12/1986 | Null et al. | |
| 4,693,730 A | 9/1987 | Miller et al. | |
| 4,705,627 A | 11/1987 | Miwa et al. | |
| 4,711,968 A | 12/1987 | Oswald et al. | |
| 4,737,170 A | 4/1988 | Searle | |
| 4,770,676 A * | 9/1988 | Sircar | B01D 53/04 55/26 |
| 4,783,205 A | 11/1988 | Searle | |
| 4,784,672 A | 11/1988 | Sircar | |
| 4,790,272 A | 12/1988 | Weber | |
| 4,814,146 A | 3/1989 | Brand et al. | |
| 4,816,039 A | 3/1989 | Krishnamurthy et al. | |
| 4,877,429 A | 10/1989 | Hunter | |
| 4,977,745 A | 12/1990 | Heichberger | |
| 5,110,328 A | 5/1992 | Yokota et al. | |
| 5,125,934 A | 6/1992 | Krishnamurthy et al. | |
| 5,169,006 A | 12/1992 | Stelzer | |
| 5,174,796 A | 12/1992 | Davis et al. | |
| 5,224,350 A | 7/1993 | Mehra | |
| 5,234,472 A | 8/1993 | Krishnamurthy et al. | |
| 5,292,990 A | 3/1994 | Kantner et al. | |
| 5,306,331 A | 4/1994 | Auvil et al. | |
| 5,354,346 A | 10/1994 | Kumar | |
| 5,365,011 A | 11/1994 | Ramachandran et al. | |
| 5,370,728 A | 12/1994 | LaSala et al. | |
| 5,486,227 A | 1/1996 | Kumar et al. | |
| 5,547,641 A | 8/1996 | Smith et al. | |
| 5,565,018 A | 10/1996 | Baksh et al. | |
| 5,672,196 A | 9/1997 | Acharya et al. | |
| 5,700,310 A | 12/1997 | Bowman et al. | |
| 5,733,451 A | 3/1998 | Coellner et al. | |
| 5,735,938 A | 4/1998 | Baksh et al. | |
| 5,750,026 A | 5/1998 | Gadkaree et al. | |
| 5,769,928 A | 6/1998 | Leavitt | |
| 5,779,768 A | 7/1998 | Anand et al. | |
| 5,792,239 A | 8/1998 | Reinhold, III et al. | |
| 5,807,423 A | 9/1998 | Lemcoff et al. | |
| 5,811,616 A | 9/1998 | Holub et al. | |
| 5,827,358 A | 10/1998 | Kulish et al. | |
| 5,882,380 A | 3/1999 | Sircar | |
| 5,906,673 A | 5/1999 | Reinhold, III et al. | |
| 5,912,426 A | 6/1999 | Smolarek. et al. | |
| 5,914,294 A | 6/1999 | Park et al. | |
| 5,924,307 A | 7/1999 | Nenov | |
| 5,935,444 A | 8/1999 | Johnson et al. | |
| 5,968,234 A | 10/1999 | Midgett, II et al. | |
| 5,976,221 A | 11/1999 | Bowman et al. | |
| 5,997,617 A | 12/1999 | Czabala et al. | |
| 6,007,606 A | 12/1999 | Baksh et al. | |
| 6,011,192 A | 1/2000 | Baker et al. | |
| 6,023,942 A | 2/2000 | Thomas et al. | |
| 6,053,966 A | 4/2000 | Moreau et al. | |
| 6,063,161 A | 5/2000 | Keefer et al. | |
| 6,096,115 A | 8/2000 | Kleinberg | |
| 6,099,621 A | 8/2000 | Ho | |
| 6,102,985 A | 8/2000 | Naheiri et al. | |
| 6,129,780 A | 10/2000 | Millet et al. | |
| 6,136,222 A | 10/2000 | Friesen et al. | |
| 6,147,126 A | 11/2000 | DeGeorge et al. | |
| 6,152,991 A | 11/2000 | Ackley | |
| 6,156,101 A | 12/2000 | Naheiri | |
| 6,171,371 B1 | 1/2001 | Derive et al. | |
| 6,176,897 B1 | 1/2001 | Keefer | |
| 6,179,900 B1 | 1/2001 | Behling et al. | |
| 6,183,538 B1 | 2/2001 | Naheiri | |
| 6,194,079 B1 | 2/2001 | Hekal | |
| 6,210,466 B1 | 4/2001 | Whysall et al. | |
| 6,231,302 B1 | 5/2001 | Bonardi | |
| 6,245,127 B1 | 6/2001 | Kane et al. | |
| 6,284,021 B1 | 9/2001 | Lu et al. | |
| 6,311,719 B1 | 11/2001 | Hill et al. | |
| 6,345,954 B1 | 2/2002 | Al-Himyary et al. | |
| 6,398,853 B1 | 6/2002 | Keefer et al. | |
| 6,402,813 B2 | 6/2002 | Monereau et al. | |
| 6,406,523 B1 | 6/2002 | Connor et al. | |
| 6,425,938 B1 | 7/2002 | Xu et al. | |
| 6,432,379 B1 | 8/2002 | Heung | |
| 6,436,171 B1 | 8/2002 | Wang et al. | |
| 6,444,012 B1 | 9/2002 | Dolan et al. | |
| 6,444,014 B1 | 9/2002 | Mullhaupt et al. | |
| 6,444,523 B1 | 9/2002 | Fan et al. | |
| 6,444,610 B1 | 9/2002 | Yamamoto | |
| 6,451,095 B1 | 9/2002 | Keefer et al. | |
| 6,457,485 B2 | 10/2002 | Hill et al. | |
| 6,458,187 B1 | 10/2002 | Fritz et al. | |
| 6,464,761 B1 | 10/2002 | Bugli | |
| 6,471,749 B1 | 10/2002 | Kawai et al. | |
| 6,471,939 B1 | 10/2002 | Boix et al. | |
| 6,488,747 B1 | 12/2002 | Keefer | |
| 6,497,750 B2 | 12/2002 | Butwell et al. | |
| 6,500,234 B1 | 12/2002 | Ackley et al. | |
| 6,500,241 B2 | 12/2002 | Reddy | |
| 6,500,404 B1 | 12/2002 | Camblor Fernandez et al. | |
| 6,503,299 B2 | 1/2003 | Baksh et al. | |
| 6,506,351 B1 | 1/2003 | Jain et al. | |
| 6,514,318 B2 | 2/2003 | Keefer | |
| 6,514,319 B2 | 2/2003 | Keefer et al. | |
| 6,517,609 B1 | 2/2003 | Monereau et al. | |
| 6,531,516 B2 | 3/2003 | Davis et al. | |
| 6,533,846 B1 | 3/2003 | Keefer et al. | |
| 6,565,627 B1 | 5/2003 | Golden et al. | |
| 6,565,635 B2 | 5/2003 | Keefer et al. | |
| 6,565,825 B2 | 5/2003 | Ohji et al. | |

(56) References Cited

U.S. PATENT DOCUMENTS

| | | |
|---|---|---|
| 6,572,678 B1 | 6/2003 | Wijmans et al. |
| 6,579,341 B2 | 6/2003 | Baker et al. |
| 6,593,541 B1 | 7/2003 | Herren |
| 6,595,233 B2 | 7/2003 | Pulli |
| 6,605,136 B1 | 8/2003 | Graham et al. |
| 6,607,584 B2 | 8/2003 | Moreau et al. |
| 6,630,012 B2 | 10/2003 | Wegeng et al. |
| 6,631,626 B1 | 10/2003 | Hahn |
| 6,641,645 B1 | 11/2003 | Lee et al. |
| 6,651,645 B1 | 11/2003 | Nunez-Suarez |
| 6,660,064 B2 | 12/2003 | Golden et al. |
| 6,660,065 B2 | 12/2003 | Byrd et al. |
| 6,692,626 B2 | 2/2004 | Keefer et al. |
| 6,712,087 B2 | 3/2004 | Hill et al. |
| 6,742,507 B2 | 6/2004 | Keefer et al. |
| 6,746,515 B2 | 6/2004 | Wegeng et al. |
| 6,752,852 B1 | 6/2004 | Jacksier et al. |
| 6,770,120 B2 | 8/2004 | Neu et al. |
| 6,773,225 B2 | 8/2004 | Yuri et al. |
| 6,802,889 B2 | 10/2004 | Graham et al. |
| 6,814,771 B2 | 11/2004 | Scardino et al. |
| 6,835,354 B2 | 12/2004 | Woods et al. |
| 6,840,985 B2 | 1/2005 | Keefer |
| 6,866,950 B2 | 3/2005 | Connor et al. |
| 6,889,710 B2 | 5/2005 | Wagner |
| 6,890,376 B2 | 5/2005 | Arquin et al. |
| 6,893,483 B2 | 5/2005 | Golden et al. |
| 6,902,602 B2 | 6/2005 | Keefer et al. |
| 6,916,358 B2 | 7/2005 | Nakamura et al. |
| 6,918,953 B2 | 7/2005 | Lomax, Jr. et al. |
| 6,921,597 B2 | 7/2005 | Keefer et al. |
| 6,974,496 B2 | 12/2005 | Wegeng et al. |
| 7,025,801 B2 | 4/2006 | Monereau |
| 7,027,929 B2 | 4/2006 | Wang |
| 7,029,521 B2 | 4/2006 | Johansson |
| 7,074,323 B2 | 7/2006 | Ghijsen |
| 7,077,891 B2 | 7/2006 | Jaffe et al. |
| 7,087,331 B2 | 8/2006 | Keefer et al. |
| 7,094,275 B2 | 8/2006 | Keefer et al. |
| 7,097,925 B2 | 8/2006 | Keefer et al. |
| 7,112,239 B2 | 9/2006 | Kimbara et al. |
| 7,117,669 B2 | 10/2006 | Kaboord et al. |
| 7,122,073 B1 | 10/2006 | Notaro et al. |
| 7,128,775 B2 | 10/2006 | Celik et al. |
| 7,144,016 B2 | 12/2006 | Gozdawa |
| 7,160,356 B2 | 1/2007 | Koros et al. |
| 7,160,367 B2 | 1/2007 | Babicki et al. |
| 7,166,149 B2 | 1/2007 | Dunne et al. |
| 7,172,645 B1 | 2/2007 | Pfister et al. |
| 7,189,280 B2 | 3/2007 | Alizadeh-Khiavi et al. |
| 7,243,679 B2 | 7/2007 | Thelen |
| 7,250,073 B2 | 7/2007 | Keefer et al. |
| 7,250,074 B2 | 7/2007 | Tonkovich et al. |
| 7,255,727 B2 | 8/2007 | Monereau et al. |
| 7,258,725 B2 | 8/2007 | Ohmi et al. |
| 7,276,107 B2 | 10/2007 | Baksh et al. |
| 7,279,029 B2 | 10/2007 | Occhialini et al. |
| 7,285,350 B2 | 10/2007 | Keefer et al. |
| 7,297,279 B2 | 11/2007 | Johnson et al. |
| 7,311,763 B2 | 12/2007 | Neary |
| RE40,006 E | 1/2008 | Keefer et al. |
| 7,314,503 B2 | 1/2008 | Landrum et al. |
| 7,354,562 B2 | 4/2008 | Ying et al. |
| 7,387,849 B2 | 6/2008 | Keefer et al. |
| 7,390,350 B2 | 6/2008 | Weist, Jr. et al. |
| 7,404,846 B2 | 7/2008 | Golden et al. |
| 7,438,079 B2 | 10/2008 | Cohen et al. |
| 7,449,049 B2 | 11/2008 | Thomas et al. |
| 7,456,131 B2 | 11/2008 | Klett et al. |
| 7,510,601 B2 | 3/2009 | Whitley et al. |
| 7,527,670 B2 | 5/2009 | Ackley et al. |
| 7,553,568 B2 | 6/2009 | Keefer |
| 7,578,864 B2 | 8/2009 | Watanabe et al. |
| 7,604,682 B2 | 10/2009 | Seaton |
| 7,637,989 B2 | 12/2009 | Bong |
| 7,641,716 B2 | 1/2010 | Lomax, Jr. et al. |
| 7,645,324 B2 | 1/2010 | Rode et al. |
| 7,651,549 B2 | 1/2010 | Whitley |
| 7,674,319 B2 | 3/2010 | Lomax, Jr. et al. |
| 7,674,539 B2 | 3/2010 | Keefer et al. |
| 7,687,044 B2 | 3/2010 | Keefer et al. |
| 7,713,333 B2 | 5/2010 | Rege et al. |
| 7,717,981 B2 | 5/2010 | LaBuda et al. |
| 7,722,700 B2 | 5/2010 | Sprinkle |
| 7,731,782 B2 | 6/2010 | Kelley et al. |
| 7,740,687 B2 | 6/2010 | Reinhold, III |
| 7,744,676 B2 | 6/2010 | Leitmayr et al. |
| 7,744,677 B2 | 6/2010 | Barclay et al. |
| 7,758,051 B2 | 7/2010 | Roberts-Haritonov et al. |
| 7,758,988 B2 | 7/2010 | Keefer et al. |
| 7,763,098 B2 | 7/2010 | Alizadeh-Khiavi et al. |
| 7,763,099 B2 | 7/2010 | Verma et al. |
| 7,792,983 B2 | 9/2010 | Mishra et al. |
| 7,793,675 B2 | 9/2010 | Cohen et al. |
| 7,806,965 B2 | 10/2010 | Stinson |
| 7,819,948 B2 | 10/2010 | Wagner |
| 7,828,877 B2 | 11/2010 | Sawada et al. |
| 7,828,880 B2 | 11/2010 | Moriya et al. |
| 7,854,793 B2 | 12/2010 | Rarig et al. |
| 7,858,169 B2 | 12/2010 | Yamashita |
| 7,862,645 B2 | 1/2011 | Whitley et al. |
| 7,867,320 B2 | 1/2011 | Baksh et al. |
| 7,902,114 B2 | 3/2011 | Bowie et al. |
| 7,938,886 B2 | 5/2011 | Hershkowitz et al. |
| 7,947,118 B2 | 5/2011 | Rarig et al. |
| 7,947,120 B2 | 5/2011 | Deckman et al. |
| 7,959,720 B2 | 6/2011 | Deckman et al. |
| 8,016,918 B2 | 9/2011 | LaBuda et al. |
| 8,034,164 B2 | 10/2011 | Lomax, Jr. et al. |
| 8,071,063 B2 | 12/2011 | Reyes et al. |
| 8,128,734 B2 | 3/2012 | Song |
| 8,142,745 B2 | 3/2012 | Reyes et al. |
| 8,142,746 B2 | 3/2012 | Reyes et al. |
| 8,192,709 B2 | 6/2012 | Reyes et al. |
| 8,210,772 B2 | 7/2012 | Gillecriosd |
| 8,227,121 B2 | 7/2012 | Adams et al. |
| 8,262,773 B2 | 9/2012 | Northrop et al. |
| 8,262,783 B2 | 9/2012 | Stoner et al. |
| 8,268,043 B2 | 9/2012 | Celik et al. |
| 8,268,044 B2 | 9/2012 | Wright et al. |
| 8,272,401 B2 | 9/2012 | McLean |
| 8,287,629 B2 | 10/2012 | Fujita et al. |
| 8,319,090 B2 | 11/2012 | Kitamura |
| 8,337,594 B2 | 12/2012 | Corma Canos et al. |
| 8,361,200 B2 | 1/2013 | Sayari et al. |
| 8,361,205 B2 | 1/2013 | Desai et al. |
| 8,377,173 B2 | 2/2013 | Chuang |
| 8,444,750 B2 | 5/2013 | Deckman et al. |
| 8,449,649 B2 | 5/2013 | Greenough |
| 8,470,395 B2 | 6/2013 | Khiavi et al. |
| 8,480,795 B2 | 7/2013 | Siskin et al. |
| 8,512,569 B2 | 8/2013 | Eaton et al. |
| 8,518,356 B2 | 8/2013 | Schaffer et al. |
| 8,529,662 B2 | 9/2013 | Kelley et al. |
| 8,529,663 B2 | 9/2013 | Reyes et al. |
| 8,529,664 B2 | 9/2013 | Deckman et al. |
| 8,529,665 B2 | 9/2013 | Manning et al. |
| 8,535,414 B2 | 9/2013 | Johnson et al. |
| 8,545,602 B2 | 10/2013 | Chance et al. |
| 8,551,444 B2 | 10/2013 | Agnihotri et al. |
| 8,573,124 B2 | 11/2013 | Havran et al. |
| 8,591,627 B2 | 11/2013 | Jain |
| 8,591,634 B2 | 11/2013 | Winchester et al. |
| 8,616,233 B2 | 12/2013 | McLean et al. |
| 8,657,922 B2 | 2/2014 | Yamawaki et al. |
| 8,673,059 B2 | 3/2014 | Leta et al. |
| 8,680,344 B2 | 3/2014 | Weston et al. |
| 8,715,617 B2 | 5/2014 | Genkin et al. |
| 8,752,390 B2 | 6/2014 | Wright et al. |
| 8,753,428 B2 | 6/2014 | Lomax, Jr. et al. |
| 8,778,051 B2 | 7/2014 | Weist, Jr. et al. |
| 8,784,533 B2 | 7/2014 | Leta et al. |
| 8,784,534 B2 | 7/2014 | Kamakoti et al. |
| 8,784,535 B2 | 7/2014 | Ravikovitch et al. |

(56) References Cited

U.S. PATENT DOCUMENTS

| | | |
|---|---|---|
| 8,790,618 B2 | 7/2014 | Adams et al. |
| 8,795,411 B2 | 8/2014 | Hufton et al. |
| 8,808,425 B2 | 8/2014 | Genkin et al. |
| 8,808,426 B2 | 8/2014 | Sundaram |
| 8,814,985 B2 | 8/2014 | Gerds et al. |
| 8,852,322 B2 | 10/2014 | Gupta et al. |
| 8,858,683 B2 | 10/2014 | Deckman |
| 8,875,483 B2 | 11/2014 | Wettstein |
| 8,906,138 B2 | 12/2014 | Rasmussen et al. |
| 8,921,637 B2 | 12/2014 | Sundaram et al. |
| 8,936,669 B2 | 1/2015 | Doong et al. |
| 8,939,014 B2 | 1/2015 | Kamakoti et al. |
| 9,005,561 B2 | 4/2015 | Leta |
| 9,017,457 B2 | 4/2015 | Tammera |
| 9,028,595 B2 | 5/2015 | Sundaram et al. |
| 9,034,078 B2 | 5/2015 | Wanni et al. |
| 9,034,079 B2 | 5/2015 | Deckman et al. |
| 9,050,553 B2 | 6/2015 | Alizadeh-Khiavi et al. |
| 9,067,168 B2 | 6/2015 | Frederick et al. |
| 9,067,169 B2 | 6/2015 | Patel |
| 9,095,809 B2 | 8/2015 | Deckman et al. |
| 9,108,145 B2 | 8/2015 | Kalbassi et al. |
| 9,120,049 B2 | 9/2015 | Sundaram et al. |
| 9,126,138 B2 | 9/2015 | Deckman et al. |
| 9,162,175 B2 | 10/2015 | Sundaram |
| 9,168,483 B2 | 10/2015 | Ravikovitch et al. |
| 9,168,485 B2 | 10/2015 | Deckman et al. |
| 9,272,264 B2 | 3/2016 | Coupland |
| 9,278,338 B2 | 3/2016 | Coupland |
| 9,358,493 B2 | 6/2016 | Tammera et al. |
| 9,573,116 B2 | 2/2017 | Johnson et al. |
| 9,597,655 B2 | 3/2017 | Beeckman |
| 9,737,846 B2 | 8/2017 | Carstensen et al. |
| 9,744,521 B2 | 8/2017 | Brody et al. |
| 10,040,022 B2 | 8/2018 | Fowler et al. |
| 10,080,991 B2 | 9/2018 | Johnson et al. |
| 10,080,992 B2 | 9/2018 | Nagavarapu et al. |
| 10,124,286 B2 | 11/2018 | McMahon et al. |
| 2001/0047824 A1 | 12/2001 | Hill et al. |
| 2002/0053547 A1 | 5/2002 | Schlegel et al. |
| 2002/0124885 A1 | 9/2002 | Hill et al. |
| 2002/0162452 A1 | 11/2002 | Butwell et al. |
| 2003/0075485 A1 | 4/2003 | Ghijsen |
| 2003/0129101 A1 | 7/2003 | Zettel |
| 2003/0131728 A1 | 7/2003 | Kanazirev et al. |
| 2003/0145726 A1 | 8/2003 | Gueret et al. |
| 2003/0170527 A1 | 9/2003 | Finn et al. |
| 2003/0188635 A1 | 10/2003 | Lomax, Jr. et al. |
| 2003/0202918 A1 | 10/2003 | Ashida et al. |
| 2003/0205130 A1 | 11/2003 | Neu et al. |
| 2003/0223856 A1 | 12/2003 | Yuri et al. |
| 2004/0099142 A1 | 5/2004 | Arquin et al. |
| 2004/0118277 A1 | 6/2004 | Kim |
| 2004/0118747 A1 | 6/2004 | Cutler et al. |
| 2004/0197596 A1 | 10/2004 | Connor et al. |
| 2004/0232622 A1 | 11/2004 | Gozdawa |
| 2005/0045041 A1 | 3/2005 | Hechinger et al. |
| 2005/0109419 A1 | 5/2005 | Ohmi et al. |
| 2005/0114032 A1 | 5/2005 | Wang |
| 2005/0129952 A1 | 6/2005 | Sawada et al. |
| 2005/0014511 A1 | 7/2005 | Keefer et al. |
| 2005/0145111 A1 | 7/2005 | Keefer et al. |
| 2005/0150378 A1 | 7/2005 | Dunne et al. |
| 2005/0229782 A1 | 10/2005 | Monereau et al. |
| 2005/0252378 A1 | 11/2005 | Celik et al. |
| 2006/0017940 A1 | 1/2006 | Takayama |
| 2006/0048648 A1 | 3/2006 | Gibbs et al. |
| 2006/0049102 A1 | 3/2006 | Miller et al. |
| 2006/0076270 A1 | 4/2006 | Poshusta et al. |
| 2006/0099096 A1 | 5/2006 | Shaffer et al. |
| 2006/0105158 A1 | 5/2006 | Fritz et al. |
| 2006/0116430 A1 | 6/2006 | Wentink et al. |
| 2006/0116460 A1 | 6/2006 | Georget et al. |
| 2006/0162556 A1 | 7/2006 | Ackley et al. |
| 2006/0165574 A1 | 7/2006 | Sayari |
| 2006/0169142 A1 | 8/2006 | Rode et al. |
| 2006/0236862 A1 | 10/2006 | Golden et al. |
| 2007/0084241 A1 | 4/2007 | Kretchmer et al. |
| 2007/0084344 A1 | 4/2007 | Moriya et al. |
| 2007/0222160 A1 | 9/2007 | Roberts-Haritonov et al. |
| 2007/0253872 A1 | 11/2007 | Keefer et al. |
| 2007/0261550 A1 | 11/2007 | Ota |
| 2007/0261557 A1 | 11/2007 | Gadkaree et al. |
| 2007/0283807 A1 | 12/2007 | Whitley |
| 2008/0051279 A1 | 2/2008 | Klett et al. |
| 2008/0072822 A1 | 3/2008 | White |
| 2008/0128655 A1 | 6/2008 | Garg et al. |
| 2008/0202336 A1 | 8/2008 | Hofer et al. |
| 2008/0282883 A1 | 11/2008 | Rarig et al. |
| 2008/0282884 A1 | 11/2008 | Kelley et al. |
| 2008/0282885 A1 | 11/2008 | Deckman et al. |
| 2008/0282886 A1 | 11/2008 | Reyes et al. |
| 2008/0282887 A1 | 11/2008 | Chance |
| 2008/0282892 A1 | 11/2008 | Deckman et al. |
| 2008/0289497 A1 | 11/2008 | Barclay et al. |
| 2008/0307966 A1 | 12/2008 | Stinson |
| 2008/0314550 A1 | 12/2008 | Greco |
| 2009/0004073 A1 | 1/2009 | Gleize et al. |
| 2009/0014902 A1 | 1/2009 | Koivunen et al. |
| 2009/0025553 A1 | 1/2009 | Keefer et al. |
| 2009/0025555 A1 | 1/2009 | Lively et al. |
| 2009/0037550 A1 | 2/2009 | Mishra et al. |
| 2009/0071333 A1 | 3/2009 | LaBuda et al. |
| 2009/0079870 A1 | 3/2009 | Matsui |
| 2009/0107332 A1 | 4/2009 | Wagner |
| 2009/0151559 A1 | 6/2009 | Verma et al. |
| 2009/0162268 A1 | 6/2009 | Hufton et al. |
| 2009/0180423 A1 | 7/2009 | Kroener |
| 2009/0241771 A1 | 10/2009 | Manning et al. |
| 2009/0284013 A1 | 11/2009 | Anand et al. |
| 2009/0294366 A1 | 12/2009 | Wright et al. |
| 2009/0308248 A1 | 12/2009 | Siskin et al. |
| 2009/0314159 A1 | 12/2009 | Haggerty |
| 2010/0059701 A1 | 3/2010 | McLean |
| 2010/0077920 A1 | 4/2010 | Baksh et al. |
| 2010/0089241 A1 | 4/2010 | Stoner et al. |
| 2010/0186445 A1 | 7/2010 | Minta et al. |
| 2010/0212493 A1 | 8/2010 | Rasmussen et al. |
| 2010/0251887 A1 | 10/2010 | Jain |
| 2010/0252497 A1 | 10/2010 | Ellison et al. |
| 2010/0263534 A1 | 10/2010 | Chuang |
| 2010/0282593 A1 | 11/2010 | Speirs et al. |
| 2010/0288704 A1 | 11/2010 | Amsden et al. |
| 2011/0011803 A1 | 1/2011 | Koros |
| 2011/0020202 A1 | 1/2011 | Gadkaree et al. |
| 2011/0031103 A1 | 2/2011 | Deckman et al. |
| 2011/0067440 A1 | 3/2011 | Van Aken |
| 2011/0067770 A1 | 3/2011 | Pederson et al. |
| 2011/0123878 A1 | 5/2011 | Jangbarwala |
| 2011/0146494 A1 | 6/2011 | Desai et al. |
| 2011/0217218 A1 | 9/2011 | Gupta et al. |
| 2011/0277620 A1 | 11/2011 | Havran et al. |
| 2011/0291051 A1 | 12/2011 | Hershkowitz et al. |
| 2011/0296871 A1 | 12/2011 | Van Soest-Vercammen et al. |
| 2011/0308524 A1 | 12/2011 | Brey et al. |
| 2012/0024150 A1 | 2/2012 | Moniot |
| 2012/0024152 A1 | 2/2012 | Yamawaki et al. |
| 2012/0031144 A1 | 2/2012 | Northrop et al. |
| 2012/0067216 A1 | 3/2012 | Corma-Canos et al. |
| 2012/0152115 A1 | 6/2012 | Gerds et al. |
| 2012/0222551 A1 | 9/2012 | Deckman |
| 2012/0222552 A1 | 9/2012 | Ravikovitch et al. |
| 2012/0222553 A1 | 9/2012 | Kamakoti et al. |
| 2012/0222554 A1 | 9/2012 | Leta et al. |
| 2012/0222555 A1 | 9/2012 | Gupta et al. |
| 2012/0255377 A1 | 10/2012 | Kamakoti et al. |
| 2012/0272823 A1 | 11/2012 | Halder et al. |
| 2012/0308456 A1 | 12/2012 | Leta et al. |
| 2012/0312163 A1* | 12/2012 | Leta .................. B01D 53/526 95/97 |
| 2013/0061755 A1 | 3/2013 | Frederick et al. |
| 2013/0095996 A1 | 4/2013 | Buelow et al. |
| 2013/0225898 A1 | 8/2013 | Sundaram et al. |
| 2014/0013955 A1 | 1/2014 | Tammera et al. |

(56) References Cited

U.S. PATENT DOCUMENTS

| | | |
|---|---|---|
| 2014/0060326 A1 | 3/2014 | Sundaram et al. |
| 2014/0157984 A1 | 6/2014 | Deckman et al. |
| 2014/0157986 A1 | 6/2014 | Ravikovitch et al. |
| 2014/0208797 A1 | 7/2014 | Kelley et al. |
| 2014/0216254 A1 | 8/2014 | Tammera et al. |
| 2014/0326136 A1* | 11/2014 | Doong .............. B01D 53/0462 95/41 |
| 2015/0013377 A1 | 1/2015 | Oelfke |
| 2015/0068397 A1 | 3/2015 | Boulet et al. |
| 2015/0101483 A1 | 4/2015 | Perry et al. |
| 2015/0196870 A1 | 7/2015 | Albright et al. |
| 2015/0328578 A1 | 11/2015 | Deckman et al. |
| 2016/0023155 A1 | 1/2016 | Ramkumar et al. |
| 2016/0129433 A1 | 5/2016 | Tammera et al. |
| 2016/0166972 A1 | 6/2016 | Owens et al. |
| 2016/0236135 A1 | 8/2016 | Tammera et al. |
| 2016/0332105 A1 | 11/2016 | Tammera et al. |
| 2016/0332106 A1 | 11/2016 | Tammera et al. |
| 2017/0056810 A1* | 3/2017 | Johnson .............. B01D 53/047 |
| 2017/0056814 A1 | 3/2017 | Marshall et al. |
| 2017/0113173 A1 | 4/2017 | Fowler et al. |
| 2017/0113175 A1 | 4/2017 | Fowler et al. |
| 2017/0136405 A1 | 5/2017 | Ravikovitch et al. |
| 2017/0266604 A1 | 9/2017 | Tammera et al. |
| 2017/0282114 A1 | 10/2017 | Owens et al. |
| 2017/0341011 A1 | 11/2017 | Nagavarapu et al. |
| 2017/0341012 A1 | 11/2017 | Nagavarapu et al. |
| 2018/0001301 A1 | 1/2018 | Brody et al. |
| 2018/0056229 A1 | 3/2018 | Denton et al. |
| 2018/0056235 A1 | 3/2018 | Wang et al. |
| 2018/0169565 A1 | 6/2018 | Brody et al. |
| 2018/0169617 A1 | 6/2018 | Brody et al. |
| 2018/0339263 A1 | 11/2018 | Dehaas et al. |

FOREIGN PATENT DOCUMENTS

| | | |
|---|---|---|
| EP | 0904827 | 3/1999 |
| EP | 1674555 | 6/2006 |
| EP | 2823872 | 1/2015 |
| FR | 2854819 | 5/2003 |
| FR | 2924951 | 6/2009 |
| JP | 58-114715 | 7/1983 |
| JP | 59-232174 | 12/1984 |
| JP | 60-189318 | 12/1985 |
| JP | 2002-253818 | 10/1990 |
| JP | 04-180978 | 6/1992 |
| JP | 06006736 | 6/1992 |
| JP | 3477280 | 8/1995 |
| JP | 2011-169640 | 6/1999 |
| JP | 2011-280921 | 10/1999 |
| JP | 2000-024445 | 8/2001 |
| JP | 2002-348651 | 12/2002 |
| JP | 2006-016470 | 1/2006 |
| JP | 2006-036849 | 2/2006 |
| JP | 2008-272534 | 11/2008 |
| KR | 101349424 | 1/2014 |
| WO | WO2002/024309 | 3/2002 |
| WO | WO2002/073728 | 9/2002 |
| WO | WO2005/090793 | 9/2005 |
| WO | WO2010/024643 | 3/2010 |
| WO | WO2011/139894 | 11/2011 |

OTHER PUBLICATIONS

Earl, D. J. et al., (2005) "Parallel tempering: Theory, applications, and new perspectives," *Phys Chem Chem Phys*, vol. 7, pp. 3910-3916.
ExxonMobil Research and Engineering and QuestAir (2008) "A New Commercialized Process for Lower Cost H2 Recovery—Rapid Cycle Pressure Swing Adsorption (RCPSA)," *Brochure*, 4 Pgs.
Fang, H. et al., (2013) "First principles derived, transferable force fields for $CO_2$ adsorption in Na-exchanged cationic zeolites," Phys Chem Chem Phys, vol. 15, p. 12882-12894.
Fang, H., et al., (2012) "Prediction of CO2 Adsorption Properties in Zeolites Using Force Fields Derived from Periodic Dispersion-Corrected DFT Calculations," J Phys Chem C, 10692, 116, ACS Publications.
Farooq, S. et al. (1990) "Continuous Countercurrent Flow Model for a Bulk PSA Separation Process," *AIChE J.*, v36 (2) p. 310-314.
FlowServe (2005) "Exceeding Expectations, US Navy Cuts Maintenance Costs With Flowserve GX-200 Non-Contacting Seal Retrofits," *Face-to-Face*, v17.1, 8 pgs.
Foster, M.D., et al. "A geometric solution to the largest-free-sphere problem in zeolite frameworks", *Microporous and Mesoporous Materials*, vol. 90, pp. 32-38.
Frenkel, D. et al., (2002) "Understanding Molecular Simulation: From Algorithms to Applications", 2nd ed., *Academic Press*, pp. 292-301.
Garcia, E. J., et al. (2014) "Tuning the Adsorption Properties of Zeolites as Adsorbents for CO2 Separation: Best Compromise between the Working Capacity and Selectivity", *Ind. Eng. Chem. Res.*, vol. 53, pp. 9860-9874.
GE Oil & Gas (2007) "Dry Gas Seal Retrofit," Florene, Italy, www.ge.com/oilandgas, 4 pgs.
Harris, J. G. et al., (1995) "Carbon Dioxide's Liquid—Vapor Coexistence Curve and Critical Properties as Predicted by a Simple Molecular Model", *J Phys Chem*, vol. 99, pp. 12021-12024.
Hill, J. R. et al., (1995) "Molecular Mechanics Potential for Silica and Zeolite Catalysts Based on ab Initio Calculations. 2. Aluminosilicates", *J Phys Chem*, vol. 99, pp. 9536-9550.
Hopper, B. et al. (2008) "World's First 10,000 psi Sour Gas Injection Compressor," *Proceedings of the 37th Turbomachinery Symposium*, pp. 73-95.
Jain, S., et al. (2003) "Heuristic design of pressure swing adsorption: a preliminary study", *Separation and Purification Technology*, vol. 33, pp. 25-43.
Kim J. et al. (2012) "Predicting Large CO2 Adsorption in Aluminosilicate Zeolites for Postcombustion Carbon Dioxide Capture", *J. Am. Chem, Soc.*, vol. 134, pp. 18940-18940.
Kärger, J., et al.(2012) "Diffusion in Nanoporous Materials" , Whiley-VCH publisher, vol. 1, Chapter 16, pp. 483-501.
Kikkinides, E. S. et al. (1995) "Natural Gas Desulfurization by Adsorption: Feasibility and Multiplicity of Cyclic Steady States," *Ind. Eng. Chem. Res.* V. 34, pp. 255-262.
Lin, L., et al. (2012) "In silica screening of carbon-capture materials", *Nature Materials*, vol. 1, pp. 633-641.
Liu, Q. et al., (2010) "NaKA sorbents with high $CO_2$-over-$N_2$ selectivity and high capacity to adsorb $CO_2$," *Chem Commun,*, vol. 46, pp. 4502-4504.
Lowenstein, W., (1954) "The Distribution of Aluminum in the Tetra-Hedra of Silicates and Aluminates" Am Mineral, 92-96.
Neimark, A. V. et al., (1997) "Calibration of Pore Volume in Adsorption Experiments and Theoretical Models", *Langmuir*, vol. 13, pp. 5148-5160.
Palomino, M., et al. (2009) "New Insights on CO2-Methane Seapration Using LTA Zeolites with Different Si/Al Ratios and a First Comparison with MOFs", Langmar, vol. 26(3), pp. 1910-1917.
Patcas, F.C. et al.(2007) "CO Oxidation Over Structured Carriers: A Comparison of Ceramic Forms, Honeycombs and Beads", *Chem Engineering Science*, v. 62, pp. 3984-3990.
Peng, D. Y., et al., (1976) "A New Two-Constant Equation of State", *Ind Eng Chem Fundam*, vol. 15, pp. 59-64.
Pham, T. D. et al., (2013) "Carbon Dioxide and Nitrogen Adsorption on Cation-Exchanged SSZ-13 Zeolites", *Langmuir*, vol. 29, pp. 832-839.
Pophale, R., et al., (2011) "A database of new zeolite-like materials", *Phys Chem Chem Phys*, vol. 13(27), pp. 12407-12412.
Potoff, J. J. et al., (2001) "Vapor-Liquid Equilibria of Mixtures Containing Alkanes. Carbon Dioxide, and Nitrogen", AIChE J, vol. 47(7), pp. 1676-1682.
Rameshni, Mahin "Strategies for Sour Gas Field Developments," *Worley Parsons-Brochure*, 20 pp.
Reyes, S. C. et al. (1997) "Frequency Modulation Methods for Diffusion and Adsorption Measurements in Porous Solids," *J. Phys. Chem. B.* v101, pp. 614-622.

(56) References Cited

OTHER PUBLICATIONS

Rezaei, F. et al. (2009) "Optimum Structured Adsorbents for Gas Separation Process", *Chem. Engineering Science,* v. 64, pp. 5182-5191.
Richardson, J.T. et al. (2000) "Properties of Ceramic Foam Catalyst Supports: Pressure Dop", *Applied Catalysis A: General* v. 204, pp. 19-32.
Robinson, D. B., et al., (1985) "The development of the Peng—Robinson Equation and its Application to Phase Equilibrium in a System Containing Methanol," *Fluid Phase Equilibria,* vol. 24, pp. 25-41.
Ruthven, D. M. et al. (1996) "Performance of a Parallel Passage Adsorbent Contactor," *Gas. Sep. Purif,* vol. 10, No. 1, pp. 63-73.
Stahley, J. S. (2003) "Design, Operation, and Maintenance Considerations for Improved Dry Gas Seal Reliability in Centrifugal Compressors," *Dresser-Rand, Tech. Paper* 134, 15 pages.
Santos, M. S (2011) "New Cycle configuration to enhance performance of kinetic PSA processes" Chemical Engineering Science 66, pp. 1590-1599.
Snurr, R. Q. et al., (1993) "Prediction of Adsorption of Aromatic Hydrocarbons in Silicalite from Grand Canonical Monte Carlo Simulations with Biased Insertions", *J Phys Chem,* vol. 97, pp. 13742-13752.
Stemmet, C.P. et al. (2006) "Solid Foam Packings for Multiphase Reactors: Modelling of Liquid Holdup and Mass Transfer", *Chem. Engineering Research and Design,* v. 84(A12), pp. 1134-1141.
Suzuki, M. (1985) "Continuous-Countercurrent-Flow Approximation for Dynamic Steady State Profile of Pressure Swing Adsorption" *AIChE Symp. Ser.* v81 (242) pp. 67-73.
Talu, O. et al., (2001), "Reference potentials for adsorption of helium, argon, methane, and krypton in high-silica zeolites," *Colloids and Surfaces A: Physicochemical and Engineering Aspects,* vol. 83-93, pp. 83-93.
Walton, K. S. et al., (2006) "$CO_2$ adsorption in Y and X zeolites modified by alkali metal cation exchange," *Microporous and Mesoporous Mat,* vol. 91, pp. 78-84.
Willems, T. F. et al., (2012) "Algorithms and tools for high-throughput geometry-based analysis of crystalline porous materials" *Microporous Mesoporous Mat,* vol. 149, pp. 134-141.
Zukal, A., et al., (2009) "Isosteric heats of adsorption of carbon dioxide on zeolite MCM-22 modified by alkali metal cations", *Adsorption,* vol. 15, pp. 264-270.
U.S. Appl. No. 16/252,975, filed Jan. 21, 2019, Krishna Nagavarapu et al.
U.S. Appl. No. 16/258,266, filed Jan. 25, 2019, Barnes et al.
U.S. Appl. No. 16/263,940, filed Jan. 31, 2019, Johnson.
U.S. Appl. No. 62/783,766, filed Dec. 21, 2019, Fulton et al.
Allen, M. P. et al., (1987) "Computer Simulation of Liquids" Clarendon Press, pp. 156-160.
Asgari, M. et al., (2014) "Designing A Commercial Scale Pressure Swing Adsorber For Hydrogen Purification" *Petroleum & Coal,* vol. 56(5), pp. 552-561.
Baerlocher, C. et al., (2017) International Zeolite Association's "Database of Zeolite Structures," available at http://www.iza-stucture.org/databases/, downloaded Jun. 15, 2018, 1 page.
Burtch, N.C. et al., (2015) "Molecular-level Insight into Unusual Low Pressure $CO_2$ Affinity in Pillared Metal-Organic Frameworks," *J Am Chem Soc,* 135, pp. 7172-7180.
Beauvais, C. et al., (2004) "Distribution of Sodium Cations in Faujasite-Type Zeolite: A Canonical Parallel Tempering Simulation Study," *J Phys Chem B,* 108, pp. 399-404.
Cheung, O. et al., (2013) "Adsorption kinetics for $CO_2$ on highly selective zeolites NaKA and nano-NaKA," *Appl Energ,* 112, pp. 1326-1336.
Cygan, R. T. et al., (2004) "Molecular Models of Hydroxide, Oxyhydroxide, and Clay Phases and the Development of a General Force Field", *J Phys Chem B,* vol. 108, pp. 1255-1266.
Deem, M. W et al., (2009) "Computational Discovery of New Zeolite-Like Materials", *J Phys Chem C,* 113, pp. 21353-21360.
Demiralp, E., et al., (1999) "Morse Stretch Potential Charge Equilibrium Force Field for Ceramics: Application to the Quartz-Stishovite Phase Transition and to Silica Glass", *Physical Review Letters,* vol. 82(8), pp. 1708-1711.
Dubbeldam, D. et al. (2016) "RASPA: molecular simulation software for adsorption and diffusion in flexible nanoporous materials" Molecular Simulation, (published online Feb. 26, 2015), vol. 42(2), pp. 81-101.
Rezaei, F. et al. (2014) "Modeling of Rapid Temperature Swing Adsorption Using Hollow Fiber Sorbents", *Chem. Engineering Science,* v. 113, pp. 62-76.

\* cited by examiner

APPARATUS AND SYSTEM FOR SWING ADSORPTION PROCESSES

CROSS-REFERENCE TO RELATED APPLICATION

This application claims the benefit of U.S. Provisional Patent Application 62/621,246 filed Jan. 24 2018 entitled APPARATUS AND SYSTEM FOR SWING ADSORPTION PROCESSES, the entirety of which is incorporated by reference herein.

FIELD

The present techniques relate to a method and system associated with swing adsorption processes used in conditioning streams for downstream processing. In particular, the method and system involves performing swing adsorption processes to dampen the temperature swing in the product stream to within acceptable limits for the downstream process.

BACKGROUND

Gas separation is useful in many industries and can typically be accomplished by flowing a mixture of gases over an adsorbent material that preferentially adsorbs one or more gas components while not adsorbing one or more other gas components. The non-adsorbed components are recovered as a separate product.

One particular type of gas separation technology is swing adsorption, such as temperature swing adsorption (TSA), pressure swing adsorption (PSA), partial pressure swing adsorption (PPSA), rapid cycle temperature swing adsorption (RCTSA), rapid cycle pressure swing adsorption (RCPSA), rapid cycle partial pressure swing adsorption (RCPPSA), and not limited to but also combinations of the fore mentioned processes, such as pressure and temperature swing adsorption. As an example, PSA processes rely on the phenomenon of gases being more readily adsorbed within the pore structure or free volume of an adsorbent material when the gas is under pressure. That is, the higher the gas pressure, the greater the amount of readily-adsorbed gas adsorbed. When the pressure is reduced, the adsorbed component is released, or desorbed from the adsorbent material.

The swing adsorption processes (e.g., PSA and/or TSA) may be used to separate gases of a gas mixture because different gases tend to fill the micropore of the adsorbent material to different extents. For example, if a gas mixture, such as natural gas, is passed under pressure through a vessel containing an adsorbent material that is more selective towards carbon dioxide than it is for methane, at least a portion of the carbon dioxide is selectively adsorbed by the adsorbent material, and the gas exiting the vessel is enriched in methane. When the adsorbent material reaches the end of its capacity to adsorb carbon dioxide, it is regenerated by reducing the pressure, thereby releasing the adsorbed carbon dioxide. Then, the adsorbent material is typically purged and repressurized prior to starting another adsorption cycle.

The swing adsorption processes typically involve adsorbent bed units, which include adsorbent beds disposed within a housing and configured to maintain fluids at various pressures for different steps in a cycle within the unit. These adsorbent bed units utilize different packing material in the bed structures. For example, the adsorbent bed units utilize checker brick, pebble beds or other available packing. As an enhancement, some adsorbent bed units may utilize engineered packing within the bed structure. The engineered packing may include a material provided in a specific configuration, such as a honeycomb, ceramic forms or the like.

Further, various adsorbent bed units may be coupled together with conduits and valves to manage the flow of fluids through the cycle. Orchestrating these adsorbent bed units involves coordinating the steps in the cycle for each of the adsorbent bed units with other adsorbent bed units in the system. A complete cycle can vary from seconds to minutes as it transfers a plurality of gaseous streams through one or more of the adsorbent bed units.

A challenge with rapid cycle processes is the temperature, compositional, and pressure pulse associated with the transition of streams through the adsorbent beds between the various steps in a cycle. For example, swing adsorption processes for deep dehydration used with LNG applications, a temperature swing step may be used to regenerate a spent adsorbent bed after an adsorption step. However, this heating of the adsorbent bed may rely upon the feed stream to cool the adsorbent bed. As a result, the feed steam may cool the adsorbent bed during the initial portion of the adsorption step. As a result, the product stream from the adsorbent bed may involve temperature swings. These temperature fluctuations are problematic for the liquefaction process.

In addition to the temperature fluctuations, compositional variations may also be present from the swing adsorption processes. For example, the composition variation in purge gas leaving an adsorbent bed during regeneration. The concentration of the contaminant initially increases, as the adsorbent bed is being rapidly regenerated, before decreasing. Furthermore, the temperature of this gas stream gradually increases during the step. Certain downstream processes may need to have the composition variations and/or temperature fluctuations within specific levels to operate properly.

Accordingly, there remains a need in the industry for apparatus, methods, and systems that provided enhancements to managing temperature, compositional, and pressure pulses associated with hydrocarbon recovery processes. In particular, a need exists for enhancements to temperature, compositional, and pressure pulses in rapid cycle swing adsorption processes.

SUMMARY OF THE INVENTION

In one embodiment, a process for removing contaminants from a gaseous feed stream with a swing adsorption process is described. The process comprising: a) performing an adsorption step, wherein the adsorption step comprises passing a gaseous feed stream through an adsorbent bed unit to remove one or more contaminants and produce a product stream; b) interrupting the flow of the gaseous feed stream; c) performing a heating step, wherein the heating step comprises passing a heating stream through the adsorbent bed unit to remove one or more contaminants from the adsorbent bed unit; d) performing a cooling step, wherein the cooling step comprises lessening the temperature of an adsorbent material in the adsorbent bed unit by passing a cooling stream through the adsorbent bed unit; and e) repeating the steps a) to d) for at least one additional cycle in the swing adsorption process.

In one or more embodiments, the process includes one or more enhancements. The process may include wherein the cycle duration is for a period greater than 1 second and less than 600 seconds; wherein the gaseous feed stream is a hydrocarbon containing stream having greater than one volume percent hydrocarbons based on the total volume of the feed stream; wherein the gaseous feed stream comprises hydrocarbons and $CO_2$, wherein the $CO_2$ content is from about 200 parts per million volume to about 2% volume of the gaseous feed stream; wherein the swing adsorption process is configured to lower the carbon dioxide ($CO_2$) level to less than 50 parts per million; passing the product stream to a downstream process; wherein the downstream process is a liquefied natural gas (LNG) process that comprises an LNG process unit; wherein the downstream process is a cryogenic natural gas liquefaction (NGL) process having a NGL process unit; wherein the cycle duration is greater than 2 seconds and less than 180 seconds; wherein the cooling stream is passed from the adsorbent bed unit to a conditioning unit; and the conditioned stream is passed from the conditioning unit to another adsorbent bed unit as the heating stream; wherein the heating stream is passed in a direction that is counter-current to the direction that the feed stream is passed; and the cooling stream is passed in a direction that is counter-current to the direction that the feed stream is passed; further comprising splitting a purge stream into the heating stream and the cooling stream; wherein the cooling stream is passed in a direction that is co-current to the direction that the feed stream is passed; and the heating stream is passed in a direction that is counter-current to the direction that the feed stream is passed; further comprising determining whether the product stream is within acceptable temperature limits; wherein the acceptable temperature limits include the product stream having temperatures within 50° F. of feed temperature of the gaseous feed stream; wherein the acceptable temperature limits include the product stream having temperatures within 25° F. of feed temperature of the gaseous feed stream; wherein the acceptable temperature limits include the product stream having temperatures within 10° F. of feed temperature of the gaseous feed stream; wherein the swing adsorption process is a rapid cycle temperature swing adsorption process; and/or wherein the swing adsorption process is a rapid cycle temperature swing adsorption process and a rapid cycle temperature swing adsorption process.

In another embodiment, a cyclical swing adsorption system is described. The system may comprise: a plurality of adsorbent bed units coupled to a plurality of manifolds, each of the adsorbent bed units is configured to pass different streams through the adsorbent bed unit between two or more steps in a swing adsorption cycle and each of the adsorbent bed units is configured to remove one or more contaminants from a feed stream to form a product stream and wherein each of the adsorbent bed units comprise: a housing; an adsorbent material disposed within the housing; a plurality of valves, wherein at least one of the plurality of valves is associated with one of the plurality of manifolds and is configured to manage fluid flow along a flow path extending between the respective manifold and the adsorbent material; and wherein the cyclical swing adsorption system is configured to dampen one or more of temperature, compositional, and pressure pulses associated with the transition of different streams through the adsorbent beds between the two or more steps in the swing adsorption cycle.

In one or more embodiments, the system includes one or more enhancements. The cyclical swing adsorption system may include wherein the plurality of manifolds comprise a feed manifold configured to pass the feed stream to the plurality of adsorbent bed units during an adsorption step, a product manifold configured to pass the product stream from the plurality of adsorbent bed units during the adsorption step, a purge manifold configured to pass a purge stream to the plurality of adsorbent bed units during a regeneration step, a purge product manifold configured to pass a purge product stream from the plurality of adsorbent bed units during the regeneration step, each manifold of the plurality of manifolds is associated with one swing adsorption process step of a plurality of swing adsorption process steps; wherein the plurality of manifolds comprise a cooling manifold configured to pass a cooling stream to the plurality of adsorbent bed units during a cooling step, a cooling product manifold configured to pass a cooling product stream from the plurality of adsorbent bed units during the cooling step; wherein the plurality of manifolds comprise a feed manifold configured to pass the feed stream to the plurality of adsorbent bed units during an adsorption step, a product manifold configured to pass the product stream from the plurality of adsorbent bed units during the adsorption step, a purge manifold configured to split the purge stream into a first purge stream configured to pass to the plurality of adsorbent bed units during a heating step and a second purge stream configured to pass to the plurality of adsorbent bed units during a cooling step, a first purge product manifold configured to pass a first purge product stream from the plurality of adsorbent bed units during the heating step, and a second purge product manifold configured to pass a second purge product stream from the plurality of adsorbent bed units during the cooling step; a heating unit disposed upstream of the split in the purge manifold, wherein the heating unit is configured to increase the temperature of the first purge stream prior to passing the plurality of adsorbent bed units during a heating step; wherein the plurality of manifolds comprise a feed manifold configured to pass the feed stream to the plurality of adsorbent bed units during an adsorption step, a product manifold configured to pass the product stream from the plurality of adsorbent bed units during the adsorption step, a purge manifold configured to pass a cooling stream to the plurality of adsorbent bed units during a cooling step and a cooling purge product manifold configured to pass a cooling purge product stream from the plurality of adsorbent bed units during the cooling step and configured to pass a heating stream to another of the plurality of adsorbent bed units during a heating step, and a second purge product manifold configured to pass a heating purge product stream from the plurality of adsorbent bed units during the heating step; a heating unit associated with the cooling purge product manifold and configured to heat the cooling purge product stream to form the heating stream; a liquefied natural gas (LNG) process that comprises an LNG process unit and is configured to receive the product stream; a cryogenic natural gas liquefaction (NGL) process having a NGL process unit and is configured to receive the product stream; a dampening system in fluid communication with the plurality of adsorbent bed units and configured to lessen one or more of temperature fluctuations, compositional fluctuations, and any combination thereof associated with the transition of the different streams through the adsorbent beds between the two or more steps in the swing adsorption cycle; wherein the dampening system comprises a heat exchanger configured to provide sufficient thermal capacitance to dampen temperature pulses in the product stream; wherein the dampening system comprises an accumulator configured to manage compositions of the product stream; wherein the dampening system comprises a mixing unit configured to manage compositions of the product stream; wherein the plurality of manifolds further comprise a blowdown manifold configured to pass a blowdown stream from the plurality of adsorbent bed units during a blowdown step; wherein the plurality of valves comprise one or more poppet valves; and/or wherein the plurality of adsorbent bed units are configured to operate at pressures between 0.1 bar absolute (bara) and 100 bara.

BRIEF DESCRIPTION OF THE FIGURES

The foregoing and other advantages of the present disclosure may become apparent upon reviewing the following detailed description and drawings of non-limiting examples of embodiments.

DETAILED DESCRIPTION OF THE INVENTION

Figure 1:
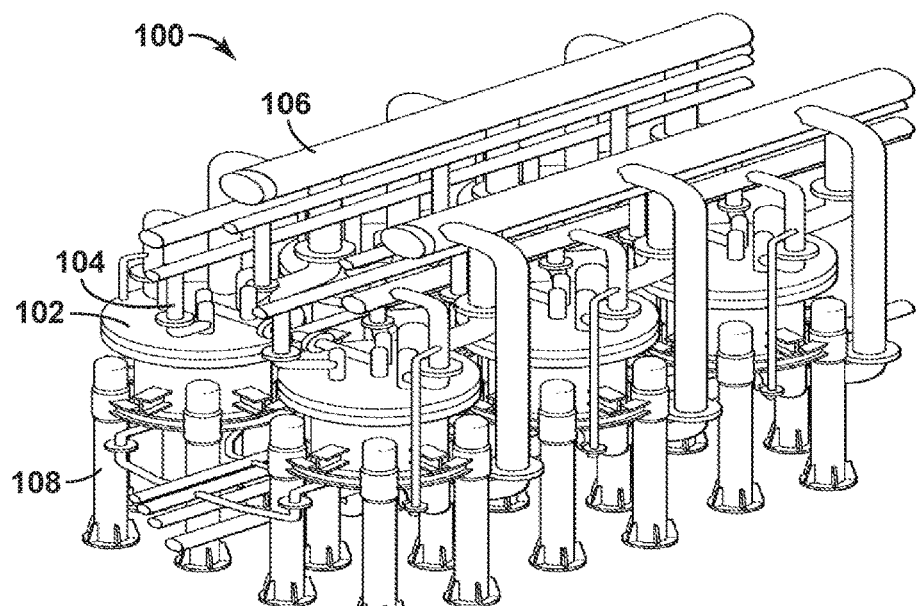
FIG. 1 is a three-dimensional diagram of the swing adsorption system with six adsorbent bed units and interconnecting piping in accordance with an embodiment of the present techniques.

Unless otherwise explained, all technical and scientific terms used herein have the same meaning as commonly understood by one of ordinary skill in the art to which this disclosure pertains. The singular terms "a," "an," and "the" include plural referents unless the context clearly indicates otherwise. Similarly, the word "or" is intended to include "and" unless the context clearly indicates otherwise. The term "includes" means "comprises." All patents and publications mentioned herein are incorporated by reference in their entirety, unless otherwise indicated. In case of conflict as to the meaning of a term or phrase, the present specification, including explanations of terms, control. Directional terms, such as "upper," "lower," "top," "bottom," "front," "back," "vertical," and "horizontal," are used herein to express and clarify the relationship between various elements. It should be understood that such terms do not denote absolute orientation (e.g., a "vertical" component can become horizontal by rotating the device). The materials, methods, and examples recited herein are illustrative only and not intended to be limiting.

As used herein, "stream" refers to fluid (e.g., solids, liquid and/or gas) being conducted through various equipment. The equipment may include conduits, vessels, manifolds, units or other suitable devices.

As used herein, "conduit" refers to a tubular member forming a channel through which something is conveyed. The conduit may include one or more of a pipe, a manifold, a tube or the like.

The provided processes, apparatus, and systems of the present techniques may be used in swing adsorption processes that remove contaminants ($CO_2$, $H_2O$, and $H_2S$) from feed streams, such as hydrocarbon containing streams. As may be appreciated and as noted above, the hydrocarbon containing feed streams may have different compositions. For example, hydrocarbon feed streams vary widely in amount of acid gas, such as from several parts per million acid gas to 90 volume percent (vol. %) acid gas. Non-limiting examples of acid gas concentrations from exemplary gas reserves sources include concentrations of approximately: (a) 4 ppm $H_2S$, 2 vol. % $CO_2$, 100 ppm $H_2O$ (b) 4 ppm $H_2S$, 0.5 vol. % $CO_2$, 200 ppm $H_2O$ (c) 1 vol. % $H_2S$, 2 vol. % $CO_2$, 150 ppm $H_2O$, (d) 4 ppm $H_2S$, 2 vol. % $CO_2$, 500 ppm $H_2O$, and (e) 1 vol. % $H_2S$, 5 vol. % $CO_2$, 500 ppm $H_2O$. Further, in certain applications the hydrocarbon containing stream may include predominately hydrocarbons with specific amounts of $CO_2$ and/or water. The gaseous feed stream utilized in the processes herein comprises, or consists essentially of, a hydrocarbon containing stream. For example, the gaseous feed stream may have greater than 0.00005 volume percent $CO_2$ based on the total volume of the gaseous feed stream and less than 2 volume percent $CO_2$ based on the total volume of the gaseous feed stream; or less than 10 volume percent $CO_2$ based on the total volume of the gaseous feed stream. In other embodiments, the gaseous feed stream may have a $CO_2$ content from about 200 parts per million volume to about 2% volume based on the gaseous feed stream. The processing of feed streams may be more problematic when certain specifications have to be satisfied.

The removal of contaminants may be performed by swing adsorption processes to prepare the stream for further downstream processing, such as NGL processing and/or LNG processing. For example, natural gas feed streams for liquefied natural gas (LNG) applications have stringent specifications on the $CO_2$ content to ensure against formation of solid $CO_2$ at cryogenic temperatures. The LNG specifications may involve the $CO_2$ content to be less than or equal to 50 ppm. Such specifications are not applied on natural gas streams in pipeline networks, which may involve the $CO_2$ content up to 2 vol. % based on the total volume of the gaseous feed stream. As such, for LNG facilities that use the pipeline gas (e.g., natural gas) as the raw feed, additional treating or processing steps are utilized to further purify the stream. Further, the present techniques may be used to lower the water content of the stream to less than 0.1 ppm. Exemplary swing adsorption processes and configurations may include U.S. Patent Application Publication Nos. 2017/0056814, 2017/0113175 and 2017/0113173, and U.S. Pat. Nos. 10,080,991, 10,124,286, 10,080,992 and 10,040,022, which are each incorporated by reference herein.

The present techniques provide configurations and processes that are utilized to enhance swing adsorption processes. As noted above, rapid cycle pressure and temperature swing adsorption processes may be used to dehydrate streams and/or remove low-level $CO_2$. To manage the temperature, compositional, and pressure pulses associated with the transition of streams within the adsorbent beds between the steps in the cycle, the present techniques may include additional steps or mechanisms. The present techniques provide a method to minimize the temperature and/or compositional fluctuations in a stream being conducted away from the rapid cycle swing adsorption process. In other configurations, a system is used to minimize the temperature and/or compositional fluctuations in one or more streams being conducted away from the rapid cycle swing adsorption process units.

For example, one configuration may include using a dampening system, which is disposed downstream of the swing adsorption bed units and upstream of the downstream processing units, such as a LNG processing unit. The dampening system may be configured to dampen the respective fluctuations. By way of example, the dampening system may include a heat exchanger and/or a piping network that may be used to provide sufficient thermal mass to provide the thermal capacitance to dampen any associated temperature pulses in the product stream.

In yet another example, the dampening system may include an accumulator may be used to manage the composition of the stream being conducted away from the adsorbent bed unit. The accumulator may be disposed downstream of the swing adsorption bed units and upstream of the downstream processing units, such as a LNG processing unit. As a specific example, the purge gas being conducted away from the adsorbent bed that is used in the regeneration step. The concentration of the contaminants in the purge product stream may initially be higher and then decrease during the later portion of the purge step. The accumulator may be used to mix or intermingle the purge product stream to manage the composition into a more uniform distribution of contaminants. Furthermore, the dampening system may include a heat exchanger and an accumulator. The temperature of the purge gas stream may gradually increases during the purge step. If the purge stream is to be provided to a downstream system, such as a gas turbine, the dampening system may manage the pulses to provide that the gas wobbe index is within acceptable limits.

In another configuration, the swing adsorption process may include a cooling step to manage the temperature of the adsorbent bed and resulting product stream. The cooling step may adjust the temperature (e.g., cool) the adsorbent bed down after a regeneration step. As such, the product stream being conducted away from the adsorbent bed unit may be at a temperature within acceptable limits. For example, in an LNG dehydration system, a cooling step may be used after the regeneration step (e.g., a temperature swing step), which may be used to regenerate a spent adsorbent bed. By using the cooling step, the feed stream may not be relied upon to adjust the temperature of the adsorbent bed during the swing adsorption cycle because the cooling step may be used to dampen the temperature fluctuations of the resulting product stream from the adsorbent bed unit. As a result of the cooling step, the product gas temperature of the product stream may be managed within a temperature threshold that may enhance the downstream processing of the product stream. Accordingly, the product stream may be passed to the liquefaction process within acceptable temperature limits. By way of example, the acceptable temperature limits may include product streams for the swing adsorption system having temperatures within 50° F. of feed temperature for the swing adsorption system, within 25° F. of feed temperature for the swing adsorption system, or within 10° F. of feed temperature for the swing adsorption system.

By way of example, conventional processes, such as molecular sieve processes, regenerate a spent molecular sieve bed by heating the bed to remove contaminants followed by cooling the molecular sieve bed to prepare the molecular sieve bed for adsorption. These steps are usually done by the same regeneration gas stream that is initially heated to heat the molecular sieve bed and later not heated to cool the molecular sieve bed. In such a configuration, the heating and cooling steps are not continuous (e.g., at least one bed is being cooled and one bed is being heated simultaneously at any instant).

For LNG applications, the purge gas stream may be sourced from end-flash compression, boil-off-gas compression, directly from the feed gas or a combination thereof. The purge stream may serve as the fuel gas stream and is limited in flow rate. To use the same stream for cooling and heating, two configurations may be utilized. The first configuration may splits the available purge stream into a cool stream and a heating for different adsorbent beds. While no recycling is performed, the cooling and heating are performed continuously (e.g., at least one adsorbent bed is being cooled and one bed is being heated at any instant). If the available flow rate is not sufficient, then the stream may be recycled. However, the stream may be recycled, such that the heating stream remains contaminant free (e.g., during the cooling step contaminants from the adsorbent bed do not move into the purge stream because of the flow direction being co-current to the feed flow direction). These steps are continuous, which is beneficial for RCPSA and/or RCPSTA cycles ensuring steady flows through various streams. The recycling provides a few additional aspects, such as a method to simultaneously control the product temperature and recover heat internally (e.g., reduced overall heat required to regenerate the bed).

In yet another configuration, the present techniques may utilize a cooling step in the swing adsorption process. The purge gas stream, which may be at or near ambient temperatures, may be split into two streams. The first stream may be heated and used to regenerate the adsorbent bed, while the second stream may be used to cool a recently regenerated adsorbent bed. The first and second streams may be introduced in a counter-current direction relative to the feed stream, which may performed to maintain the dryness of the product end of the adsorbent bed throughout the regeneration and cooling steps of the swing adsorption cycle.

Further, in another configuration, the present techniques may utilize a different cooling step in the swing adsorption process. In this configuration, the purge stream, which may be at or near ambient temperatures, is first passed in a co-current direction relative to the direction of the feed stream to cool a recently regenerated adsorbent bed. The cooling step may lessen the temperature of the adsorbent bed, while recovering some of the heat in the adsorbent bed. The resulting gas stream is then heated and introduced to a spent adsorbent bed to regenerate the adsorbent bed. This configuration has the additional benefit of recovering some of the heat from the regeneration step of the swing adsorption cycle.

In still yet another configuration, additional dampening may be achieved by operating multiple adsorbent beds out of sequence on feed. For example, a new adsorbent bed may be introduced on the feed stream, while a different adsorbent bed is already operational and producing product at nearly the feed temperature.

In other configurations, the present techniques may involve temperature swing dampening. The method of managing the temperature fluctuations and/or compositional fluctuations in the purge gas stream may use a combination of heat exchangers and mixing drums. The heat exchangers may provide a method to cool the gas stream to a specific temperature range. As the purge stream may be a small flow rate in comparison the product stream, the size of the heat exchanger may be relatively small. Furthermore, in performing dehydration, the heat exchanger may be used to condense excess water in the purge stream. The mixing drum provides the proper residence time to manage the compositional pulses, such that the gas stream leaving the mixing drum is more uniform in composition.

The present techniques may be a swing adsorption process, and specifically a rapid cycle adsorption process. The present techniques may include some additional equipment, such as one or more conduits and/or one or more manifolds that provide a fluid path for the cooling step and/or dampening system. In addition, other components and configurations may be utilized to provide the swing adsorption process, such as rapid cycle enabling hardware components (e.g., parallel channel adsorbent bed designs, rapid actuating valves, adsorbent bed configurations that integrate with other processes). Exemplary swing adsorption processes and configurations may include U.S. Patent Application Publication Nos. 2017/0056814, 2017/0113175 and 2017/0113173, and U.S. Pat. Nos. 10,080,991, 10,124,286, 10,080,992 and 10,040,022, which are each incorporated by reference herein.

In one or more configurations, a swing adsorption process may include performing various steps. For the example, the present techniques may be used to remove contaminants from a gaseous feed stream with a swing adsorption process, which may be utilized with one or more downstream processes. The process comprising: a) performing a heating step, wherein the heating step comprises passing a heating stream through the adsorbent bed unit to remove one or more contaminants from the adsorbent bed unit (e.g., a heated purge step that comprises passing a heated purge stream through an adsorbent bed unit to remove contaminants from an adsorbent bed within a housing of the adsorbent bed unit to form a purge product stream, which may be a heated purge stream); b) performing a cooling step, wherein the cooling step may comprise passing cooling stream through an adsorbent bed unit to remove lessen the temperature of the adsorbent bed within a housing of the adsorbent bed unit to lessen the temperature of the adsorbent bed prior to the one or more adsorption steps; c) performing one or more adsorption steps, wherein each of the one or more adsorption steps comprise passing a gaseous feed stream through an adsorbent bed unit having an adsorbent bed to separate contaminants from the gaseous feed stream to form a product stream. In addition, the method may include determining whether the product stream and/or purge stream is within a temperature specification and/or composition specification; d) if the product stream and/or purge stream is within the respective specification (e.g., is below a certain threshold), passing the product stream to a downstream process; and e) if the product stream is not within the specification (e.g., above a certain threshold), passing the product stream and/or purge stream through the dampening system.

In other certain embodiments, the swing adsorption process may be integrated with downstream equipment and processes. The downstream equipment and processes may include control freeze zone (CFZ) applications, niotrogen removal unit (NRU), cryogenic NGL recovery applications, LNG applications, and other such applications. Each of these different applications may include different specifications for the feed stream in the respective process. For example, a cryogenic NGL process or an LNG process and may be integrated with the respective downstream equipment. As another example, the process may involve $H_2O$ and/or $CO_2$ removal upstream of a cryogenic NGL process or the LNG process and may be integrated with respective downstream equipment.

In certain configurations, the system utilizes a combined swing adsorption process, which combines TSA and PSA, for treating of pipeline quality natural gas to remove contaminants for the stream to satisfy LNG specifications. The swing adsorption process, which may be a rapid cycle process, is used to treat natural gas that is at pipeline specifications (e.g., a feed stream of predominately hydrocarbons along with less than or equal to about 2% volume $CO_2$ and/or less than or equal to 4 ppm $H_2S$) to form a stream satisfying the LNG specifications (e.g., less than 50 ppm $CO_2$ and less than about 4 ppm $H_2S$). The product stream, which may be the LNG feed stream, may have greater than 98 volume percent hydrocarbons based on the total volume of the product stream, while the $CO_2$ and water content are below certain thresholds. The LNG specifications and cryogenic NGL specifications may involve the $CO_2$ content to be less than or equal to 50 ppm, while the water content of the stream may be less than 0.1 ppm.

Moreover, the present techniques may include a specific process flow to remove contaminants, such as $CO_2$ and/or water. For example, the process may include an adsorbent step and a regeneration step, which form the cycle. The adsorbent step may include passing a gaseous feed stream at a feed pressure and feed temperature through an adsorbent bed unit to separate one or more contaminants from the gaseous feed stream to form a product stream. The feed stream may be passed through the adsorbent bed in a forward direction (e.g., from the feed end of the adsorbent bed to the product end of the adsorbent bed). Then, the flow of the gaseous feed stream may be interrupted for a regeneration step. The regeneration step may include one or more depressurization steps, one or more heating steps, and/or one or more purge steps. The depressurization steps, which may be or include a blowdown step, may include reducing the pressure of the adsorbent bed unit by a predetermined amount for each successive depressurization step, which may be a single step and/or multiple steps. The depressurization step may be provided in a forward direction or may preferably be provided in a countercurrent direction (e.g., from the product end of the adsorbent bed to the feed end of the adsorbent bed). The heating step may include passing a heating stream into the adsorbent bed unit, which may be a recycled stream through the heating loop and is used to heat the adsorbent material. The purge step may include passing a purge stream into the adsorbent bed unit, which may be a once through purge step and the purge stream may be provided in countercurrent flow relative to the feed stream. The purge stream may be provided at a purge temperature and purge pressure, which may include the purge temperature and purge pressure being similar to the heating temperature and heating pressure used in the heating step. Then, the cycle may be repeated for additional streams. Additionally, the process may include one or more re-pressurization steps after the purge step and prior to the adsorption step. The one or more re-pressurization steps may be performed, wherein the pressure within the adsorbent bed unit is increased with each re-pressurization step by a predetermined amount with each successive re-pressurization step. The cycle duration may be for a period greater than 1 second and less than 600 seconds, for a period greater than 2 second and less than 300 seconds, for a period greater than 2 second and less than 180 seconds, for a period greater than 5 second and less than 150 seconds or for a period greater than 5 second and less than 90 seconds.

In one or more embodiments, the present techniques can be used for any type of swing adsorption process. Non-limiting swing adsorption processes for which the present techniques may be used include pressure swing adsorption (PSA), vacuum pressure swing adsorption (VPSA), temperature swing adsorption (TSA), partial pressure swing adsorption (PPSA), rapid cycle pressure swing adsorption (RCPSA), rapid cycle thermal swing adsorption (RCTSA), rapid cycle partial pressure swing adsorption (RCPPSA), as well as combinations of these processes. For example, the preferred swing adsorption process may include a combined pressure swing adsorption and temperature swing adsorption, which may be performed as a rapid cycle process. Exemplary swing adsorption processes and configurations may include U.S. Patent Application Publication Nos. 2017/0056814, 2017/0113175 and 2017/0113173, and U.S. Pat. Nos. 10,080,991, 10,124,286, 10,080,992, 10,040,022, 7,959,720, 8,545,602, 8,529,663, 8,444,750, 8,529,662 and 9,358,493, which are each herein incorporated by reference in their entirety.

Further still, in one or more configurations, a variety of adsorbent materials may be used to provide the mechanism for the separations. Examples include zeolite 3A, 4A, 5A, ZK4 and MOF-74. However, the process is not limited to these adsorbent materials, and others may be used as well.

In one configuration, a process for removing contaminants from a gaseous feed stream with a swing adsorption process is described. The process may comprise: a) performing an adsorption step, wherein the adsorption step comprises passing a gaseous feed stream through an adsorbent bed unit to remove one or more contaminants and produce a product stream; b) interrupting the flow of the gaseous feed stream; c) performing a heating step, wherein the heating step comprises passing a heating stream through the adsorbent bed unit to remove one or more contaminants from the adsorbent bed unit; d) performing a cooling step, wherein the cooling step comprises lessening the temperature of an adsorbent material in the adsorbent bed unit by passing a cooling stream through the adsorbent bed unit; and e) repeating the steps a) to d) for at least one additional cycle in the swing adsorption process.

In one or more configurations, the process may include one or more enhancements. The process may include wherein the cycle duration is for a period greater than 1 second and less than 600 seconds; wherein the gaseous feed stream is a hydrocarbon containing stream having greater than one volume percent hydrocarbons based on the total volume of the feed stream; wherein the gaseous feed stream comprises hydrocarbons and $CO_2$, wherein the $CO_2$ content is in the range of two hundred parts per million volume and less than or equal to about 2% volume of the gaseous feed stream; wherein the swing adsorption process is configured to lower the carbon dioxide ($CO_2$) level to less than 50 parts per million; passing the product stream to a downstream process; wherein the downstream process is a liquefied natural gas (LNG) process that comprises an LNG process unit; wherein the downstream process is a cryogenic natural gas liquefaction (NGL) process having a NGL process unit; wherein the cycle duration is greater than 2 seconds and less than 180 seconds; wherein the cooling stream is passed from the adsorbent bed unit to a conditioning unit; and the conditioned stream is passed from the conditioning unit to another adsorbent bed unit as the heating stream; wherein the heating stream is passed in a direction that is counter-current to the direction that the feed stream is passed; and the cooling stream is passed in a direction that is counter-current to the direction that the feed stream is passed; further comprising splitting a purge stream into the heating stream and the cooling stream; wherein the cooling stream is passed in a direction that is co-current to the direction that the feed stream is passed; and the heating stream is passed in a direction that is counter-current to the direction that the feed stream is passed; further comprising determining whether the product stream is within acceptable temperature limits; wherein the acceptable temperature limits include the product stream having temperatures within 50° F. of feed temperature of the gaseous feed stream; wherein the acceptable temperature limits include the product stream having temperatures within 25° F. of feed temperature of the gaseous feed stream; wherein the acceptable temperature limits include the product stream having temperatures within 10° F. of feed temperature of the gaseous feed stream; wherein the swing adsorption process is a rapid cycle temperature swing adsorption process; and/or wherein the swing adsorption process is a rapid cycle temperature swing adsorption process and a rapid cycle temperature swing adsorption process.

In another configuration, a cyclical swing adsorption system is described. The system may comprise: a plurality of adsorbent bed units coupled to a plurality of manifolds, each of the adsorbent bed units is configured to pass different streams through the adsorbent bed unit between two or more steps in a swing adsorption cycle and each of the adsorbent bed units is configured to remove one or more contaminants from a feed stream to form a product stream and wherein each of the adsorbent bed units comprise: a housing; an adsorbent material disposed within the housing; a plurality of valves, wherein at least one of the plurality of valves is associated with one of the plurality of manifolds and is configured to manage fluid flow along a flow path extending between the respective manifold and the adsorbent material; and wherein the cyclical swing adsorption system is configured to dampen one or more of temperature, compositional, and pressure pulses associated with the transition of different streams through the adsorbent beds between the two or more steps in the swing adsorption cycle.

In one or more configurations, the system may include one or more enhancements. The cyclical swing adsorption system may include wherein the plurality of manifolds comprise a feed manifold configured to pass the feed stream to the plurality of adsorbent bed units during an adsorption step, a product manifold configured to pass the product stream from the plurality of adsorbent bed units during the adsorption step, a purge manifold configured to pass a purge stream to the plurality of adsorbent bed units during a regeneration step, a purge product manifold configured to pass a purge product stream from the plurality of adsorbent bed units during the regeneration step, each manifold of the plurality of manifolds is associated with one swing adsorption process step of a plurality of swing adsorption process steps; wherein the plurality of manifolds comprise a cooling manifold configured to pass a cooling stream to the plurality of adsorbent bed units during a cooling step, a cooling product manifold configured to pass a cooling product stream from the plurality of adsorbent bed units during the cooling step; wherein the plurality of manifolds comprise a feed manifold configured to pass the feed stream to the plurality of adsorbent bed units during an adsorption step, a product manifold configured to pass the product stream from the plurality of adsorbent bed units during the adsorption step, a purge manifold configured to split the purge stream into a first purge stream configured to pass to the plurality of adsorbent bed units during a heating step and a second purge stream configured to pass to the plurality of adsorbent bed units during a cooling step, a first purge product manifold configured to pass a first purge product stream from the plurality of adsorbent bed units during the heating step, and a second purge product manifold configured to pass a second purge product stream from the plurality of adsorbent bed units during the cooling step; a heating unit disposed upstream of the split in the purge manifold, wherein the heating unit is configured to increase the temperature of the first purge stream prior to passing the plurality of adsorbent bed units during a heating step; wherein the plurality of manifolds comprise a feed manifold configured to pass the feed stream to the plurality of adsorbent bed units during an adsorption step, a product manifold configured to pass the product stream from the plurality of adsorbent bed units during the adsorption step, a purge manifold configured to pass a cooling stream to the plurality of adsorbent bed units during a cooling step and a cooling purge product manifold configured to pass a cooling purge product stream from the plurality of adsorbent bed units during the cooling step and configured to pass a heating stream to another of the plurality of adsorbent bed units during a heating step, and a second purge product manifold configured to pass a heating purge product stream from the plurality of adsorbent bed units during the heating step; a heating unit associated with the cooling purge product manifold and configured to heat the cooling purge product stream to form the heating stream; a liquefied natural gas (LNG) process that comprises an LNG process unit and is configured to receive the product stream; a cryogenic natural gas liquefaction (NGL) process having a NGL process unit and is configured to receive the product stream; a dampening system in fluid communication with the plurality of adsorbent bed units and configured to lessen one or more of temperature fluctuations, compositional fluctuations, and any combination thereof associated with the transition of the different streams through the adsorbent beds between the two or more steps in the swing adsorption cycle; wherein the dampening system comprises a heat exchanger configured to provide sufficient thermal capacitance to dampen temperature pulses in the product stream; wherein the dampening system comprises an accumulator configured to manage compositions of the product stream; wherein the dampening system comprises a mixing unit configured to manage compositions of the product stream; wherein the plurality of manifolds further comprise a blowdown manifold configured to pass a blowdown stream from the plurality of adsorbent bed units during a blowdown step; wherein the plurality of valves comprise one or more poppet valves; and/or wherein the plurality of adsorbent bed units are configured to operate at pressures between 0.1 bar absolute (bara) and 100 bara. The present techniques may be further understood with reference to the FIGS. 1 to 6 below.

FIG. 1 is a three-dimensional diagram of the swing adsorption system 100 having six adsorbent bed units and interconnecting piping. While this configuration is a specific example, the present techniques broadly relate to adsorbent bed units that can be deployed in a symmetrical orientation, or non-symmetrical orientation and/or combination of a plurality of hardware skids. Further, this specific configuration is for exemplary purposes as other configurations may include different numbers of adsorbent bed units.

In this system, the adsorbent bed units, such as adsorbent bed unit 102, may be configured for a cyclical swing adsorption process for removing contaminants from feed streams (e.g., fluids, gaseous or liquids). For example, the adsorbent bed unit 102 may include various conduits (e.g., conduit 104) for managing the flow of fluids through, to or from the adsorbent bed within the adsorbent bed unit 102. These conduits from the adsorbent bed units 102 may be coupled to a manifold (e.g., manifold 106) to distribute the flow to, from or between components. The adsorbent bed within an adsorbent bed unit may separate one or more contaminants from the feed stream to form a product stream. As may be appreciated, the adsorbent bed units may include other conduits to control other fluid steams as part of the process, such as purge streams, depressurizations streams, and the like. In particular, the adsorbent bed units may include startup mode equipment, such as one or more heating units (not shown), one or more external gas source manifolds, which may be one of the manifolds 106) and one or more expanders, as noted further below, which is used as part of the startup mode for the adsorbent beds. Further, the adsorbent bed unit may also include one or more equalization vessels, such as equalization vessel 108, which is dedicated to the adsorbent bed unit and may be dedicated to one or more step in the swing adsorption process. The equalization vessel 108 may be used to store the external stream, such as nitrogen for use in the startup mode cycle.

As an example, which is discussed further below in FIG. 2, the adsorbent bed unit 102 may include a housing, which may include a head portion and other body portions, that forms a substantially gas impermeable partition, an adsorbent bed disposed within the housing and a plurality of valves (e.g., poppet valves) providing fluid flow passages through openings in the housing between the interior region of the housing and locations external to the interior region of the housing. Each of the poppet valves may include a disk element that is seatable within the head or a disk element that is seatable within a separate valve seat inserted within the head (not shown). The configuration of the poppet valves may be any variety of valve patterns or configuration of types of poppet valves. As an example, the adsorbent bed unit may include one or more poppet valves, each in flow communication with a different conduit associated with different streams. The poppet valves may provide fluid communication between the adsorbent bed and one of the respective conduits, manifolds or headers. The term "in direct flow communication" or "in direct fluid communication" means in direct flow communication without intervening valves or other closure means for obstructing flow. As may be appreciated, other variations may also be envisioned within the scope of the present techniques.

The adsorbent bed comprises a solid adsorbent material capable of adsorbing one or more components from the feed stream. Such solid adsorbent materials are selected to be durable against the physical and chemical conditions within the adsorbent bed unit 102 and can include metallic, ceramic, or other materials, depending on the adsorption process. Further examples of adsorbent materials are noted further below.

Figure 2:
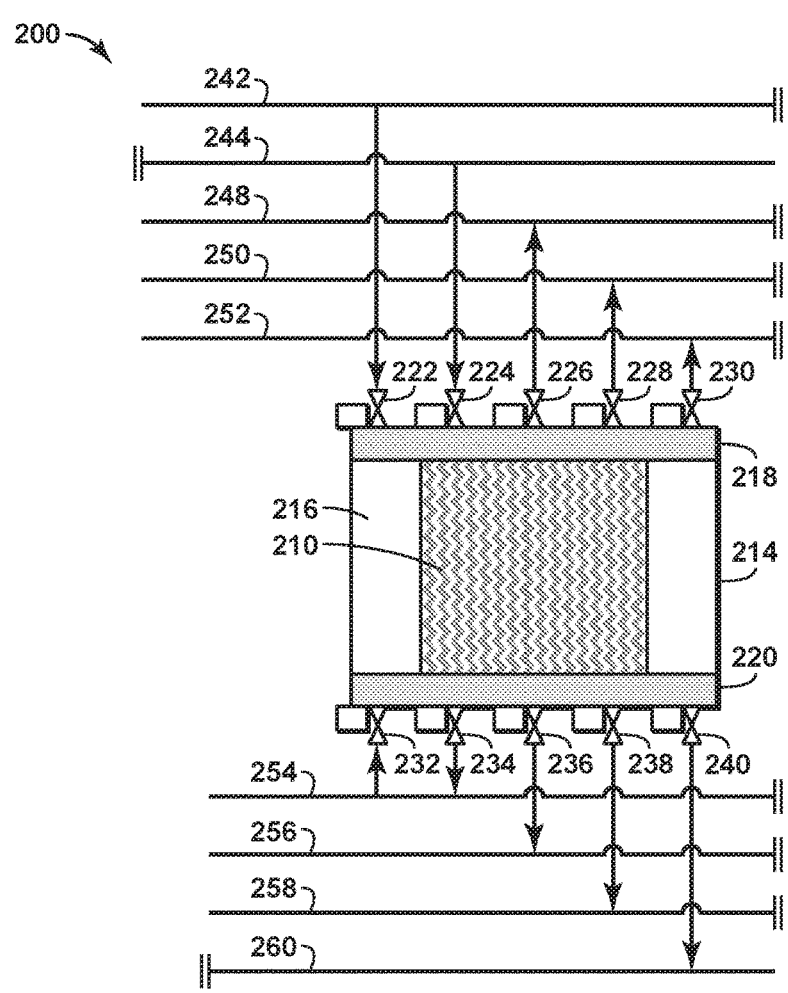
FIG. 2 is a diagram of a portion of an adsorbent bed unit having associated valve assemblies and manifolds in accordance with an embodiment of the present techniques.

FIG. 2 is a diagram of a portion of an adsorbent bed unit 200 having valve assemblies and manifolds in accordance with an embodiment of the present techniques. The portion of the adsorbent bed unit 200, which may be a portion of the adsorbent bed unit 102 of FIG. 1, includes a housing or body, which may include a cylindrical wall 214 and cylindrical insulation layer 216 along with an upper head 218 and a lower head 220. An adsorbent bed 210 is disposed between an upper head 218 and a lower head 220 and the insulation layer 216, resulting in an upper open zone, and lower open zone, which open zones are comprised substantially of open flow path volume. Such open flow path volume in adsorbent bed unit contains gas that has to be managed for the various steps. The housing may be configured to maintain a pressure from 0 bara (bar absolute) to 150 bara within the interior region.

The upper head 218 and lower head 220 contain openings in which valve structures can be inserted, such as valve assemblies 222 to 240, respectively (e.g., poppet valves). The upper or lower open flow path volume between the respective head 218 or 220 and adsorbent bed 210 can also contain distribution lines (not shown) which directly introduce fluids into the adsorbent bed 210. The upper head 218 contains various openings (not show) to provide flow passages through the inlet manifolds 242 and 244 and the outlet manifolds 248, 250 and 252, while the lower head 220 contains various openings (not shown) to provide flow passages through the inlet manifold 254 and the outlet manifolds 256, 258 and 260. Disposed in fluid communication with the respective manifolds 242 to 260 are the valve assemblies 222 to 240. If the valve assemblies 222 to 240 are poppet valves, each may include a disk element connected to a stem element which can be positioned within a bushing or valve guide. The stem element may be connected to an actuating means, such as actuating means (not shown), which is configured to have the respective valve impart linear motion to the respective stem. As may be appreciated, the actuating means may be operated independently for different steps in the process to activate a single valve or a single actuating means may be utilized to control two or more valves. Further, while the openings may be substantially similar in size, the openings and inlet valves for inlet manifolds may have a smaller diameter than those for outlet manifolds, given that the gas volumes passing through the inlets may tend to be lower than product volumes passing through the outlets.

In swing adsorption processes, the cycle involves two or more steps that each has a certain time interval, which are summed together to be the cycle time or cycle duration. These steps include regeneration of the adsorbent bed following the adsorption step using a variety of methods including pressure swing, vacuum swing, temperature swing, purging (via any suitable type of purge fluid for the process), and combinations thereof. As an example, a PSA cycle may include the steps of adsorption, depressurization, purging, and re-pressurization. When performing the separation at high pressure, depressurization and re-pressurization (which may be referred to as equalization) may be performed in multiple steps to reduce the pressure change for each step and enhance efficiency. In some swing adsorption processes, such as rapid cycle swing adsorption processes, a substantial portion of the total cycle time is involved in the regeneration of the adsorbent bed. Accordingly, any reductions in the amount of time for regeneration results in a reduction of the total cycle time. This reduction may also reduce the overall size of the swing adsorption system.

Further, one or more of the manifolds and associated valves may be utilized as a dedicated flow path for one or more streams. For example, during the adsorption or feed step, the manifold 242 and valve assembly 222 may be utilized to pass the feed gas stream to the adsorbent bed 210, while the valve assembly 236 and manifold 256 may be used to conduct away the product stream from the adsorbent bed 210. During the regeneration or purge step, the manifold 244 and valve assembly 224 may be utilized to pass the purge or heating stream to the adsorbent bed 210, while the valve assembly 236 and manifold 256 may be used to conduct away the purge product stream from the adsorbent bed 210. Further, the manifold 254 and valve assembly 232 may be utilized for a cooling stream, while the valve assembly 230 and manifold 252 may be used to conduct away the cooling product stream from the adsorbent bed 210. As may be appreciated, the purge stream and/or cooling stream may be configured to flow counter current to the feed stream in certain embodiments.

Alternatively, the swing adsorption process may involve sharing one or more of the manifolds and associated valves. Beneficially, this configuration may be utilized to lessen any additional valves or connections for startup mode for adsorbent bed unit configurations that are subject to space limitations on the respective heads.

As noted above, the present techniques include various procedures that may be utilized for the swing adsorption process. The present techniques may include additional steps or mechanisms to manage the temperature, compositional, and pressure pulses associated with the transition of streams within the adsorbent beds between the steps in the cycle. The present techniques may include including a cooling step to minimize the temperature fluctuations in a stream being conducted away from the rapid cycle swing adsorption process. In other configurations, a system may include a dampening system that may be used to minimize the temperature fluctuations and/or compositional fluctuations in one or more streams being conducted away from the rapid cycle swing adsorption process units.

Figure 3:
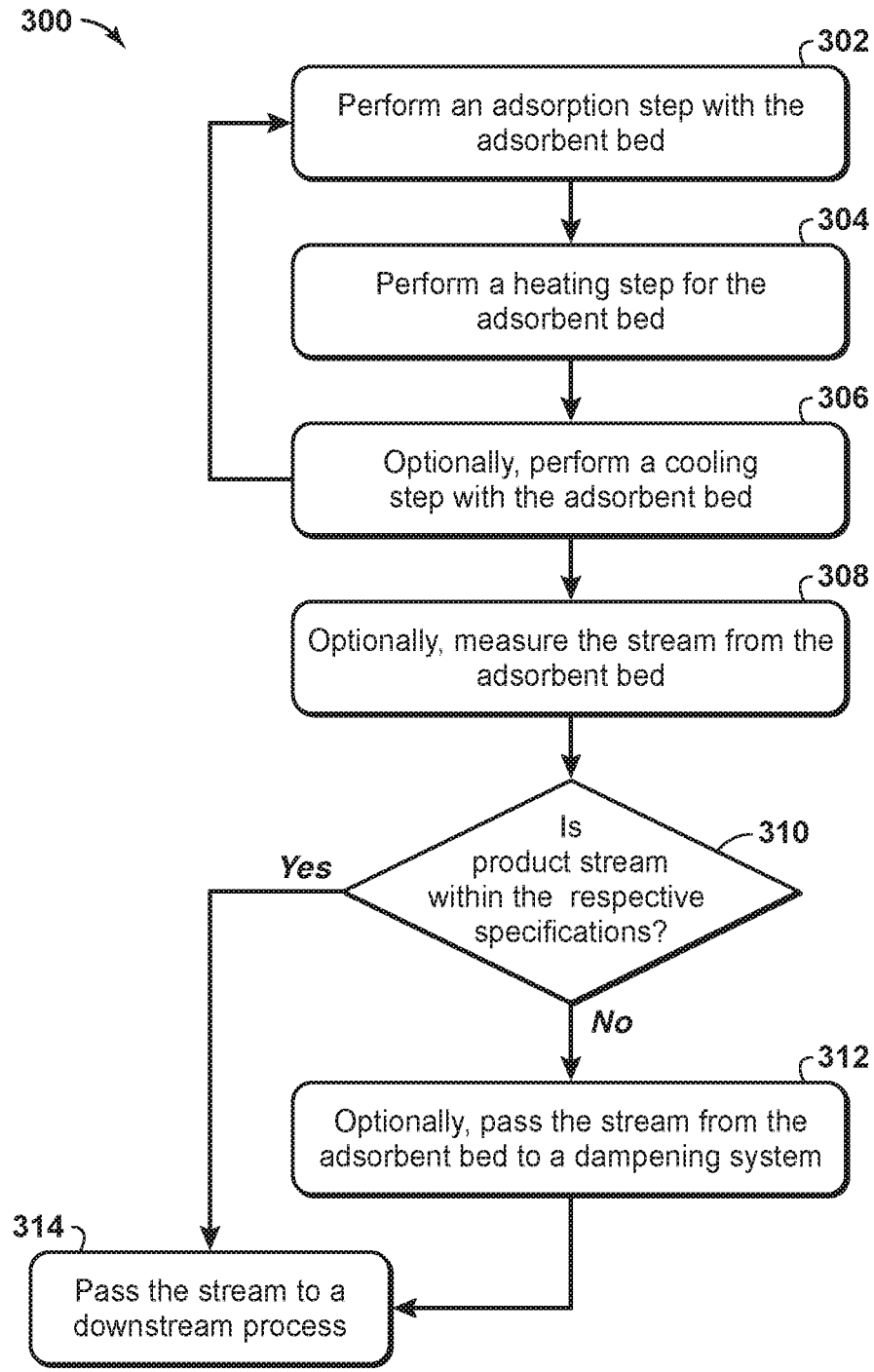
FIG. 3 is an exemplary flow chart for performing an external startup mode of a swing adsorption process in accordance with an embodiment of the present techniques.

As an example, FIG. 3 is an exemplary flow chart for performing a swing adsorption process in accordance with an embodiment of the present techniques. In this flow chart 300, the swing adsorption process may remove one or more contaminants and may be used to manage the temperature fluctuations and/or compositional fluctuations in one or more streams being conducted away from the rapid cycle swing adsorption process units. For each of the adsorbent bed units, the swing adsorption process involves performing various steps, as shown in blocks 302 to 306, which is described as being performed for a single adsorbent bed unit for simplicity. Then, the streams from the adsorbent bed units may be used with the downstream equipment, as shown in blocks 308 to 314.

The process begins by performing the swing adsorption process for the adsorbent bed units, as shown in blocks 302 to 306. At block 302, an adsorption step is performed for the adsorbent bed. The adsorption step may include passing a gaseous feed stream through the adsorbent bed to remove one or more contaminants from the gaseous feed stream and to create a product stream that is conducted away from the adsorbent bed unit. At block 304, a heating step is performed for the adsorbent bed. The heating step, which may be one or more purge steps may include passing the purge stream through the adsorbent bed to create a purge product stream that is conducted away from the adsorbent bed unit. The product purge stream may include the external stream and a portion of the contaminants within the adsorbent bed. The product purge stream may be intermingled with a fuel gas stream and may be used in a turbine. Further, the purge stream may be subjected to a heating step prior to being passed to the adsorbent bed. The heating step may heat the external stream to a temperature less than 550° F., less than 500° F., less than 450° F. or less than 350° F., and may be greater than 50° F. of the gaseous feed stream temperature, greater than 100° F. of the gaseous feed stream temperature or greater than 250° F. of the gaseous feed stream temperature. For example, the purge stream used during the purge step may be a temperature in the range between 500° F. and greater than 50° F. of the gaseous feed stream temperature, in the range between 450° F. and greater than 100° F. of the gaseous feed stream temperature or 400° F. and greater than 200° F. of the gaseous feed stream temperature. The heating of the purge stream may include passing the purge stream through a heat exchanger or similar heating unit to increase the temperature of the purge stream. At block 306, the cooling step may optionally be performed with the adsorbent bed. The cooling step may include passing a stream of gas to cool the adsorbent bed. The cooling step may include which may be a recycled stream that passes through heat exchangers or a refrigeration system to conduct away heat from the recycled stream. The process may repeat the step 302 to 306 for another swing adsorption cycle.

After being processed, the streams from the adsorbent bed units may be used with the downstream equipment, as shown in blocks 308 to 314. At block 308, the product stream may optionally be measured. The product stream may be measured by a temperature sensor and/or a gas chromatograph or using another gas component analysis equipment. The product stream may also be measured by taking samples, using a moisture analyzer. Then, at block 310, a determination may be made whether the product stream is within the respective specification. The determination may include analyzing the product stream to determine the level of one or more of the temperature, pressure, composition and any combination thereof. If the product stream is within specification (e.g., contaminants are at or below a specific threshold), the product stream may be passed to downstream process, as shown in block 314. However, if the product stream is not within specifications, the product stream may be passed to the dampening system, as shown in block 312. The dampening system may include a heat exchanger, conduits, an accumulator and/or a mixing unit. The downstream processes may include a CFZ process, a cryogenic NGL recovery process, or an LNG process, with the associated equipment for each.

By way of example, the present techniques may include additional steps or mechanisms to manage the temperature, compositional, and pressure pulses associated with the transition of streams within the adsorbent beds between the steps in the swing adsorption cycle. In particular, the method may be used to minimize the temperature and/or compositional fluctuations in a stream through the use of cooling steps in the rapid cycle swing adsorption process, which is shown in FIGS. 4 to 6.

Figure 4:
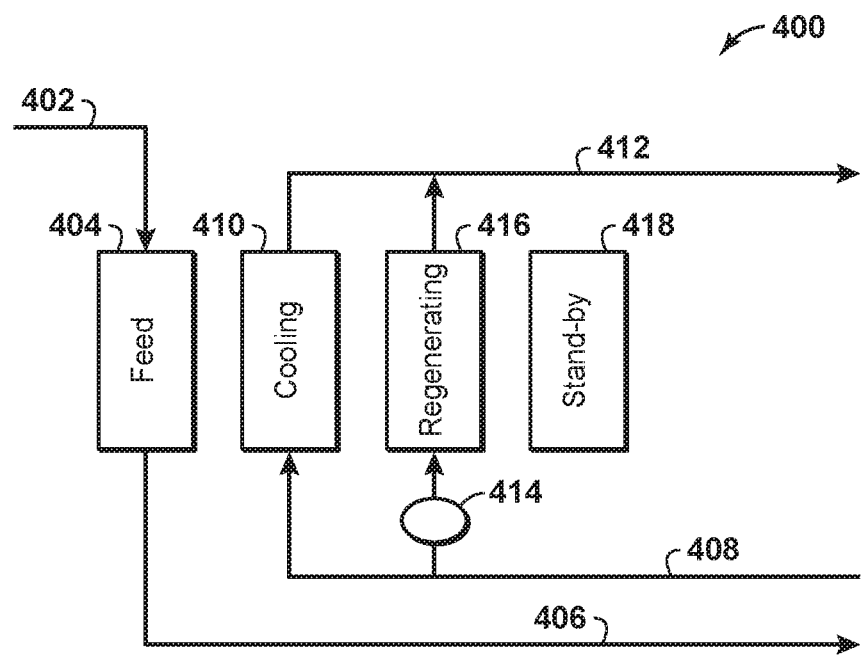
FIG. 4 is an exemplary diagram of steps in a swing adsorption process in accordance with an embodiment of the present techniques.

FIG. 4 is an exemplary diagram of a swing adsorption system 400 in accordance with an embodiment of the present techniques. In this configuration, a cooling step is used to manage the fluctuations in the streams from the swing adsorption system 400. In the swing adsorption system 400, a first adsorbent bed 404 is shown performing an adsorption step with the feed stream in a feed conduit 402 that is passed through the first adsorbent bed 404 and conducting a product stream away from the first adsorbent bed 404 via product conduit 406. A second adsorbent bed 410 is shown performing a cooling step with the cooling stream in a purge conduit 408 that is passed through the second adsorbent bed 410 and conducting a cooling product stream away from the second adsorbent bed 410 via product conduit 412. A third adsorbent bed 416 is shown performing a heating step or regeneration step with the purge stream in the purge conduit 408 that is passed through a heating unit 414 and then to the third adsorbent bed 416 and conducting a purge product stream away from the third adsorbent bed 416 via the product conduit 412. A fourth adsorbent bed 418 is shown in a stand-by with no streams being passed through the fourth adsorbent bed 418.

In this configuration, the purge stream (which may near the ambient temperatures) is split into two different streams. The first stream is heated in the heating unit 414 and used to regenerate a spent third adsorbent bed 416, while the second stream is used to cool a recently regenerated adsorbent bed 410. These streams may be introduced in a counter-current direction to the feed stream which maintains the dryness of the product end of the adsorbent bed throughout the regeneration step and cooling step. In this configuration, the cooling stream may not be recycled back to the swing adsorbent system be used as a purge stream. To regenerate an adsorption bed, the purge stream is largely devoid of the contaminant being removed. The cooling stream may contain a significant amount contaminant. As such, it cannot be recycled as a purge stream. The cooling step may be part of the overall regeneration process, such that a larger amount of contaminant is removed, while purging in this regeneration step and a smaller (but not insignificant) amount of contaminant is removed, while purging in the cooling step.

Figure 5:
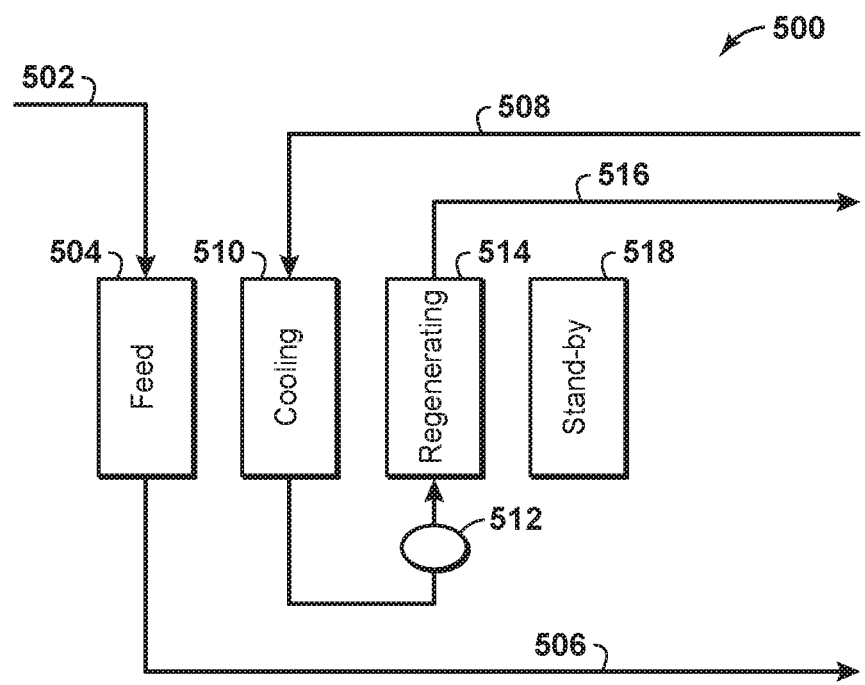
FIG. 5 is another exemplary diagram of steps in a swing adsorption process in accordance with an embodiment of the present techniques.
Figure 6:
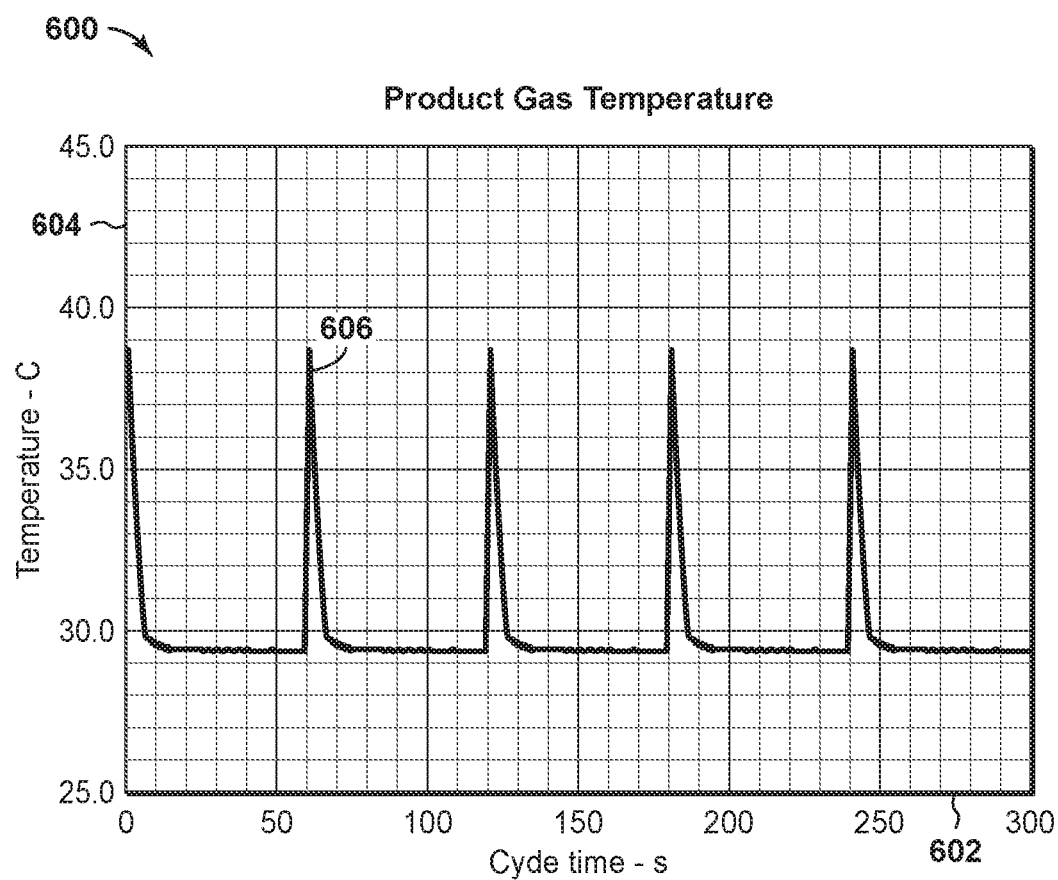
FIG. 6 is an exemplary diagram of product gas temperature from a swing adsorption process.

FIG. 5 is an exemplary diagram of a swing adsorption system 500 in accordance with an embodiment of the present techniques. In this configuration, a different cooling step is used to manage the fluctuations in the streams from the swing adsorption system 500. In the swing adsorption system 500, a first adsorbent bed 504 is shown performing an adsorption step with the feed stream in a feed conduit 502 that is passed through the first adsorbent bed 504 and conducting a product stream away from the first adsorbent bed 504 via product conduit 506. A second adsorbent bed 510 is shown performing a cooling step with the cooling stream in a purge conduit 508 that is passed through the second adsorbent bed 510 and conducting a cooling product stream away from the second adsorbent bed 510. A third adsorbent bed 514 is shown performing a heating step or regeneration step with the purge product stream that is passed through a heating unit 512 and then to the third adsorbent bed 514 and conducting a purge product stream away from the third adsorbent bed 514 via the product conduit 516. A fourth adsorbent bed 518 is shown in a stand-by with no streams being passed through the fourth adsorbent bed 518.

In this configuration, the purge stream (which may be at or near ambient temperatures) is first passed in a co-current direction to the feed direction of the feed stream to cool a recently regenerated second adsorbent bed 510. The cooling step lessens the temperature of the second adsorbent bed 510, while recovering some of the heat in the second adsorbent bed 510. The resulting gas stream is then heated and introduced to a spent third adsorbent bed 514 to regenerate the third adsorbent bed 514. This configuration has the additional advantage of recovering some of the heat from the regeneration process. In certain configurations, the purge gas exiting the adsorbent bed after the cooling step is largely devoid of contaminant as the purge gas is flowing along the feed direction. In other configurations, the purge gas stream may be in fluid communication (e.g., tied to) with an LNG dehydration process. In such configurations, the source of the purge gas stream may be adjusted to provide enhancements. Additionally, the cooling process may be continuous (e.g., at least one adsorbent bed that is being cooled at any instant of time).

FIG. 6 is an exemplary diagram 600 of product gas temperature from a swing adsorption process. In this diagram 600, the temperature response 606 is shown along a temperature axis 604 in Celsius (C) and a cycle time axis 602 in seconds (s). An example for the second configuration, as shown in FIG. 5, the temperature swing of the product end is dampened from 175° C. to 29° C. (e.g., no cooling step) from 39° C. to 29° C. The additional dampening may be achieved by operating multiple adsorbent beds out of sequence on feed. For example, a new adsorbent bed may be introduced on feed, while a different adsorbent bed is already operational and producing product at nearly the feed temperature.

In one or more embodiments, the material may include an adsorbent material supported on a non-adsorbent support. The adsorbent materials may include alumina, microporous zeolites, carbons, cationic zeolites, high silica zeolites, highly siliceous ordered mesoporous materials, sol gel materials, aluminum phosphorous and oxygen (ALPO) materials (microporous and mesoporous materials containing predominantly aluminum phosphorous and oxygen), silicon aluminum phosphorous and oxygen (SAPO) materials (microporous and mesoporous materials containing predominantly silicon aluminum phosphorous and oxygen), metal organic framework (MOF) materials (microporous and mesoporous materials comprised of a metal organic framework) and zeolitic imidazolate frameworks (ZIF) materials (microporous and mesoporous materials comprised of zeolitic imidazolate frameworks). Other materials include microporous and mesoporous sorbents functionalized with functional groups. Examples of functional groups include primary, secondary, tertiary amines and other non protogenic basic groups such as amidines, guanidines and biguanides.

In one or more embodiments, the adsorbent bed unit may be utilized to separate contaminants from a feed stream during normal operation mode. The method may include a) passing a gaseous feed stream at a feed pressure through an adsorbent bed unit having an adsorbent contactor to separate one or more contaminants from the gaseous feed stream to form a product stream, wherein the adsorbent contactor has a first portion and a second portion; b) interrupting the flow of the gaseous feed stream; performing a depressurization step, wherein the depressurization step reduces the pressure within the adsorbent bed unit; c) performing an optional heating step, wherein the heating step increases the temperature of the adsorbent bed unit to form a temperature differential between the feed end of the adsorbent bed and the product end of the adsorbent bed; and d) performing a cooling step, wherein the cooling step reduces the temperature within the adsorbent bed unit; e) performing a re-pressurization step, wherein the re-pressurization step increases the pressure within the adsorbent bed unit; and repeating the steps a) to e) for at least one additional cycle.

In one or more embodiments, when using RCTSA or an integrated RCPSA and RCTSA process, the total cycle times are typically less than 600 seconds, preferably less than 400 seconds, preferably less than 300 seconds, preferably less than 250 seconds, preferably less than 180 seconds, more preferably less than 90 seconds, and even more preferably less than 60 seconds. In other embodiment, the rapid cycle configuration may be operated at lower flow rates during startup mode as compared to normal operation mode, which may result in the cycle durations being longer than the cycle durations during normal operation mode. For example, the cycle duration may be extended to 1,000 seconds for some cycles.

In view of the many possible embodiments to which the principles of the disclosed invention may be applied, it should be recognized that the illustrative embodiments are only preferred examples of the invention and should not be taken as limiting the scope of the invention.

What is claimed is:

1. A cyclical swing adsorption system comprising:
a plurality of adsorbent bed units coupled to a plurality of manifolds, each of the plurality of adsorbent bed units is configured to pass different streams through the adsorbent bed unit between two or more steps in a swing adsorption cycle and each of the plurality of adsorbent bed units is configured to remove one or more contaminants from a feed stream to form a product stream and wherein each of the plurality of adsorbent bed units comprise:
a housing;
an adsorbent material disposed within the housing;
a plurality of valves, wherein at least one of the plurality of valves is associated with one of the plurality of manifolds and manages fluid flow along a flow path extending between a respective manifold and the adsorbent material; and
wherein the cyclical swing adsorption system is configured to dampen one or more of temperature, compositional, and pressure pulses associated with transition of the different streams through the adsorbent bed unit between the two or more steps in the swing adsorption cycle and is configured to provide sufficient thermal capacitance to dampen the temperature pulses in the product stream; and
wherein the plurality of manifolds comprise a cooling manifold configured to pass a cooling stream to the plurality of adsorbent bed units during a cooling step, a cooling product manifold configured to pass a cooling product stream from the plurality of adsorbent bed units during the cooling step.

2. The cyclical swing adsorption system of claim 1, wherein the plurality of manifolds comprise a feed manifold configured to pass the feed stream to the plurality of adsorbent bed units during an adsorption step, a product manifold configured to pass the product stream from the plurality of adsorbent bed units during the adsorption step, a purge manifold configured to pass a purge stream to the plurality of adsorbent bed units during a regeneration step, a purge product manifold configured to pass a purge product stream from the plurality of adsorbent bed units during the regeneration step, and each manifold of the plurality of manifolds is associated with one swing adsorption process step of a plurality of swing adsorption process steps.

3. The cyclical swing adsorption system of claim 1, wherein the plurality of manifolds comprise a feed manifold configured to pass the feed stream to the plurality of adsorbent bed units during an adsorption step, a product manifold configured to pass the product stream from the plurality of adsorbent bed units during the adsorption step, a purge manifold configured to split a purge stream into a first purge stream and configured to pass the first purge stream to the plurality of adsorbent bed units during a heating step and a second purge stream and configured to pass the second purge stream to the plurality of adsorbent bed units during the cooling step, a first purge product manifold configured to pass a first purge product stream from the plurality of adsorbent bed units during the heating step, and a second purge product manifold configured to pass a second purge product stream from the plurality of adsorbent bed units during the cooling step.

4. The cyclical swing adsorption system of claim 3, further comprising a heating unit disposed upstream of the split in the purge manifold, wherein the heating unit is configured to increase a temperature of the first purge stream prior to passing the first purge stream to the plurality of adsorbent bed units during the heating step.

5. The cyclical swing adsorption system of claim 1, wherein the plurality of manifolds comprise a feed manifold configured to pass the feed stream to the plurality of adsorbent bed units during an adsorption step, a product manifold configured to pass the product stream from the plurality of adsorbent bed units during the adsorption step, a purge manifold configured to pass the cooling stream to the plurality of adsorbent bed units during the cooling step, and a cooling purge product manifold configured to pass a cooling purge product stream from the plurality of adsorbent bed units during the cooling step and configured to pass a heating stream to another of the plurality of adsorbent bed units during a heating step, and a second purge product manifold configured to pass a heating purge product stream from the another of the plurality of adsorbent bed units during the heating step.

6. The cyclical swing adsorption system of claim 5, further comprising a heating unit associated with the cooling purge product manifold and configured to heat the cooling purge product stream to form the heating stream.

7. The cyclical swing adsorption system of claim 1, further comprising a liquefied natural gas (LNG) process unit or a cryogenic natural gas liquefaction (NGL) process unit which is configured to receive the product stream.

8. The cyclical swing adsorption system of claim 1, further comprising a dampening system in fluid communication with the plurality of adsorbent bed units and configured to lessen one or more of temperature fluctuations, compositional fluctuations, and any combination thereof associated with the transition of the different streams through the adsorbent bed unit between the two or more steps in the swing adsorption cycle.

9. The cyclical swing adsorption system of claim 8, wherein the dampening system comprises a heat exchanger configured to provide the sufficient thermal capacitance to dampen the temperature pulses in the product stream.

10. The cyclical swing adsorption system of claim 8, wherein the dampening system comprises an accumulator configured to manage compositions of the product stream.

11. The cyclical swing adsorption system of claim 8, wherein the dampening system comprises a mixing unit configured to manage compositions of the product stream.

12. The cyclical swing adsorption system of claim 1, wherein the plurality of manifolds further comprise a blowdown manifold configured to pass a blowdown stream from the plurality of adsorbent bed units during a blowdown step.

13. The cyclical swing adsorption system of claim 1, wherein the plurality of valves comprise one or more poppet valves.

14. The cyclical swing adsorption system of claim 1, wherein the plurality of adsorbent bed units are configured to operate at pressures between 0.1 bar absolute (bara) and 100 bara.

* * * * *